United States Patent Office 2,966,659
Patented Dec. 27, 1960

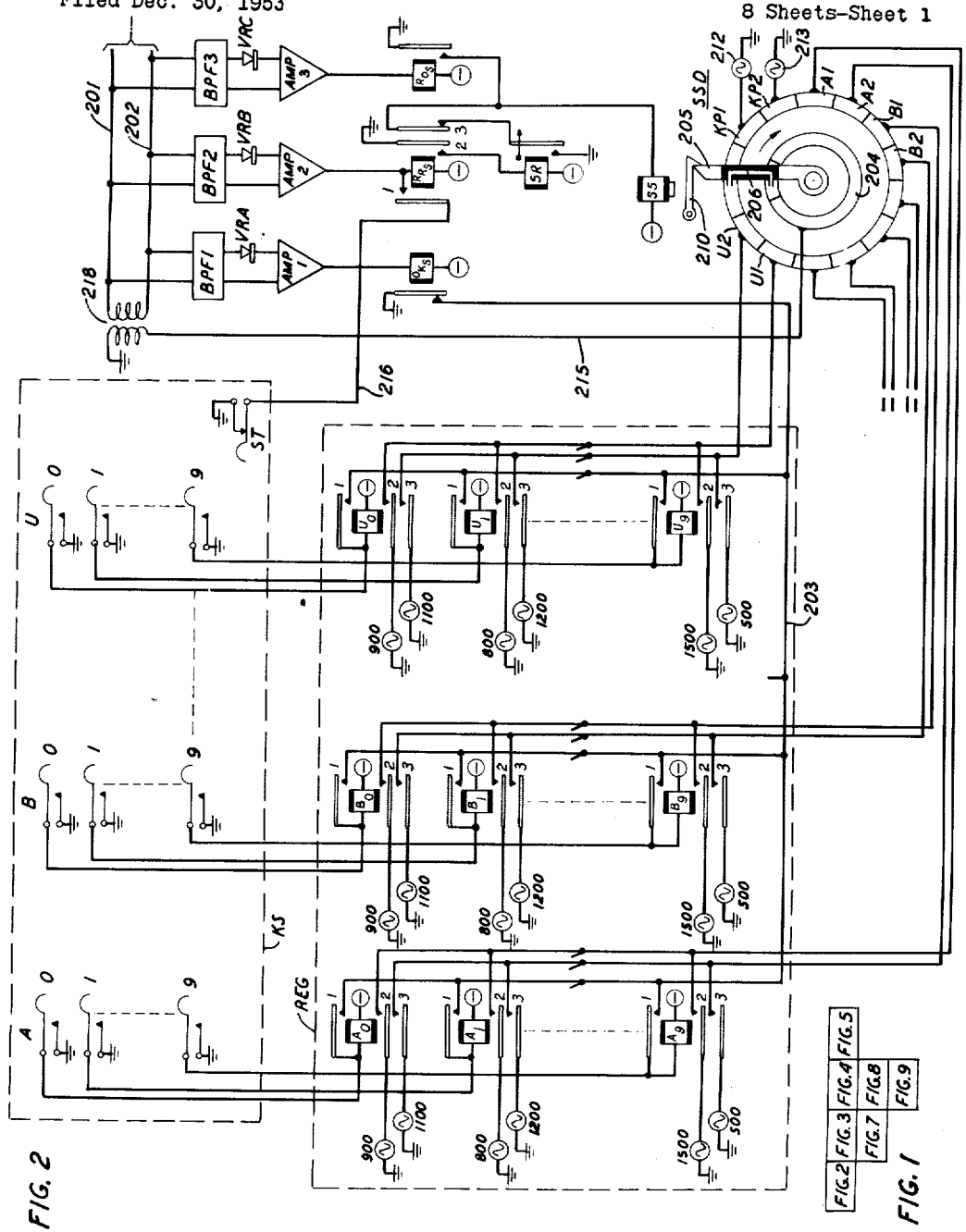

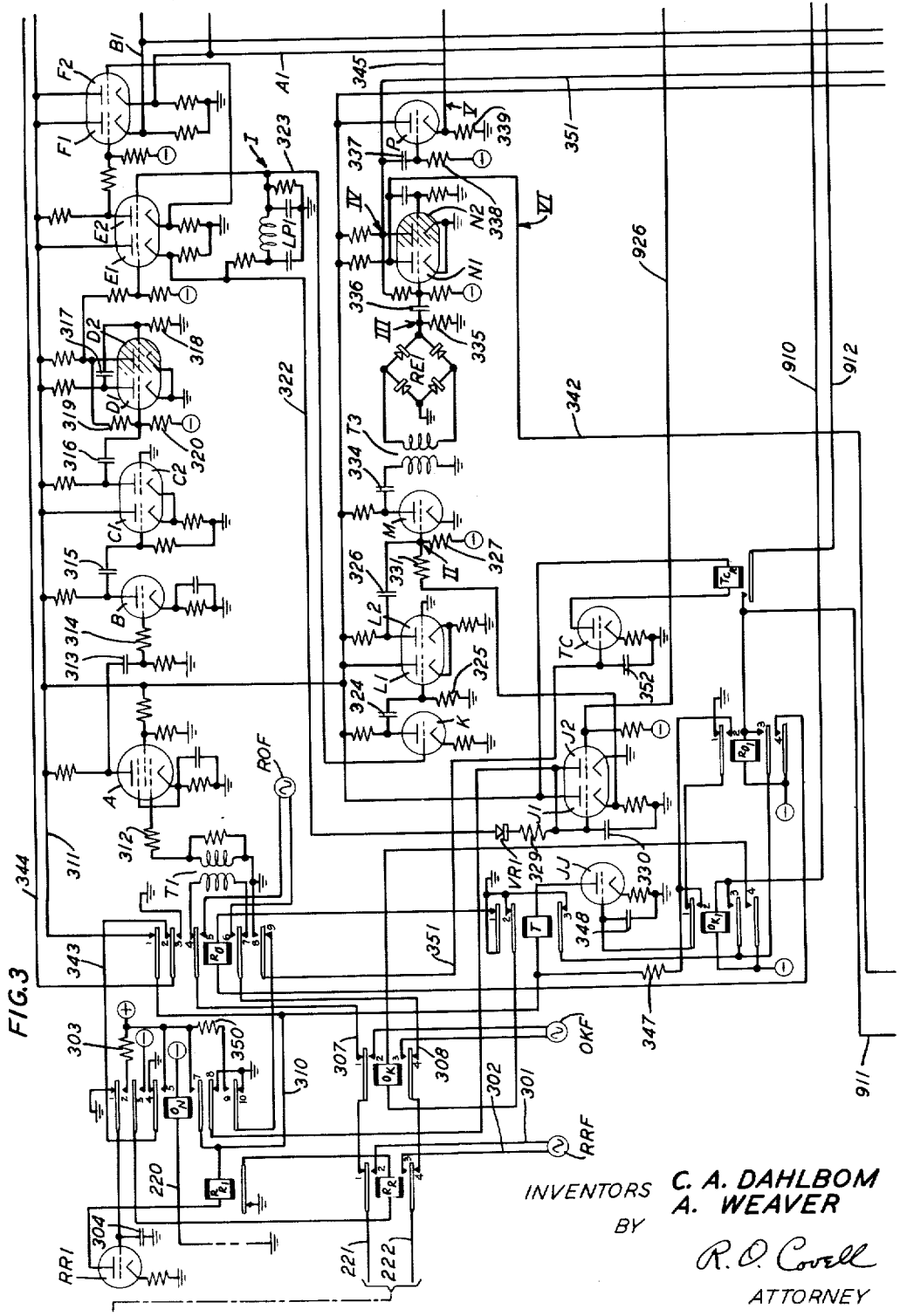

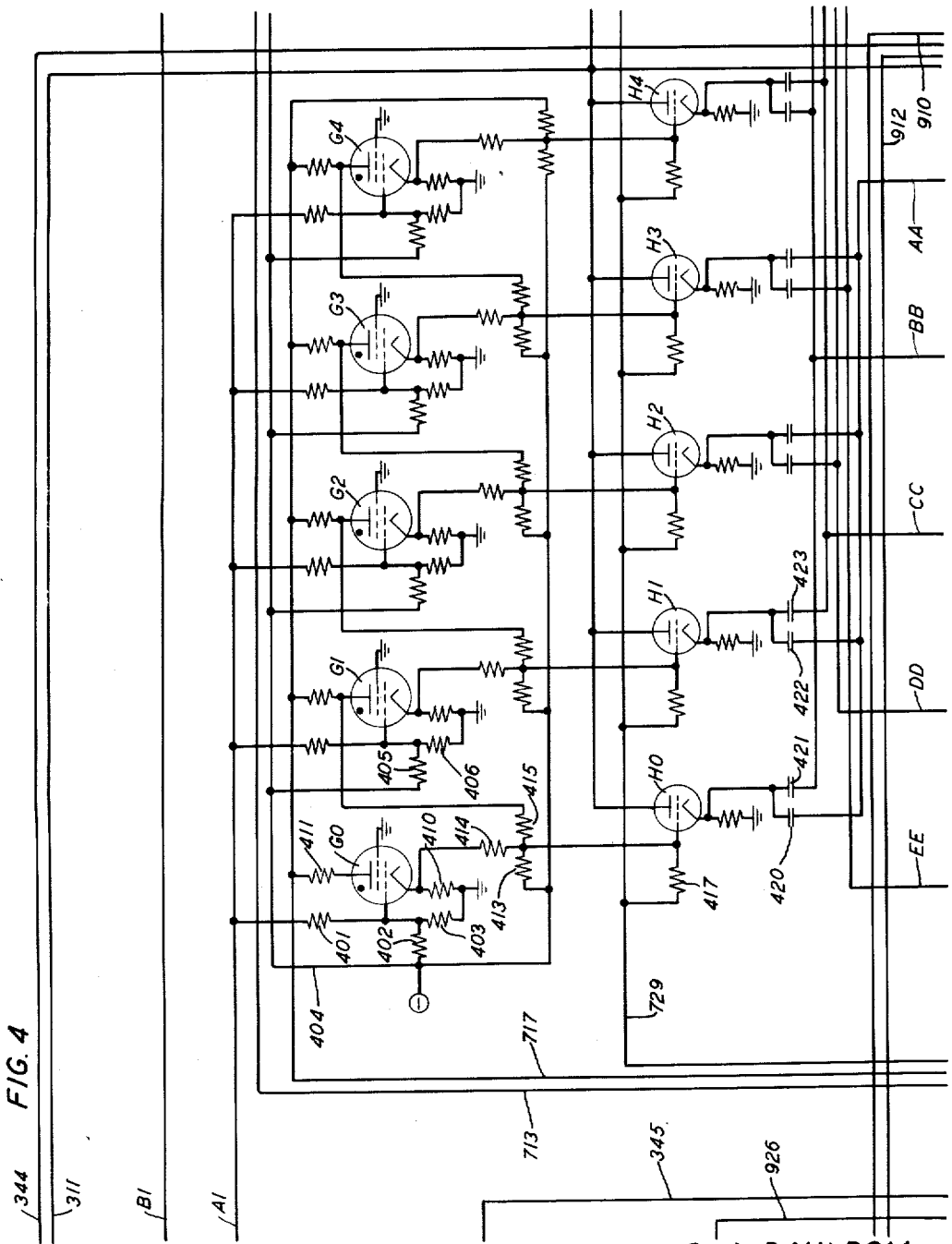

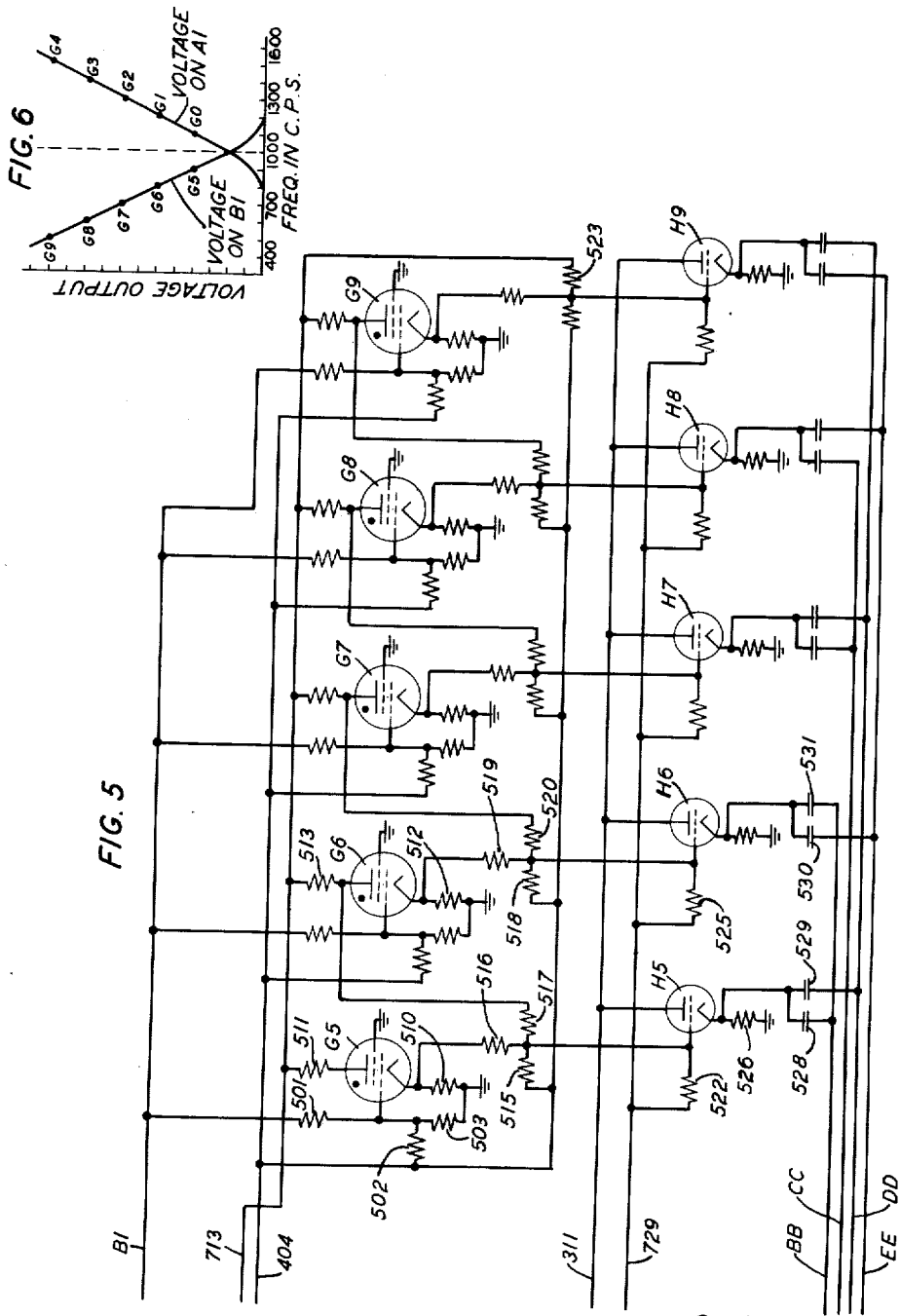

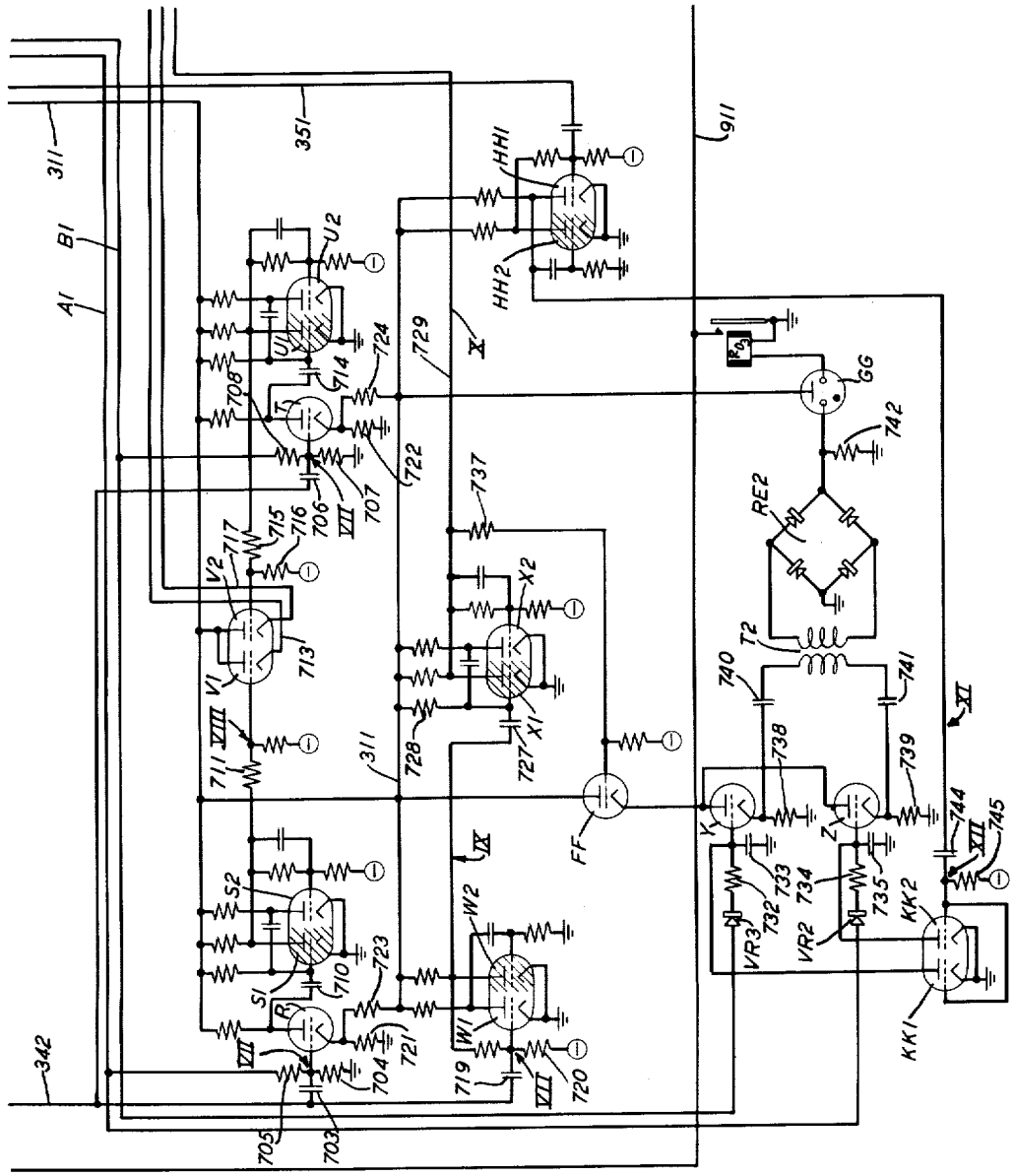

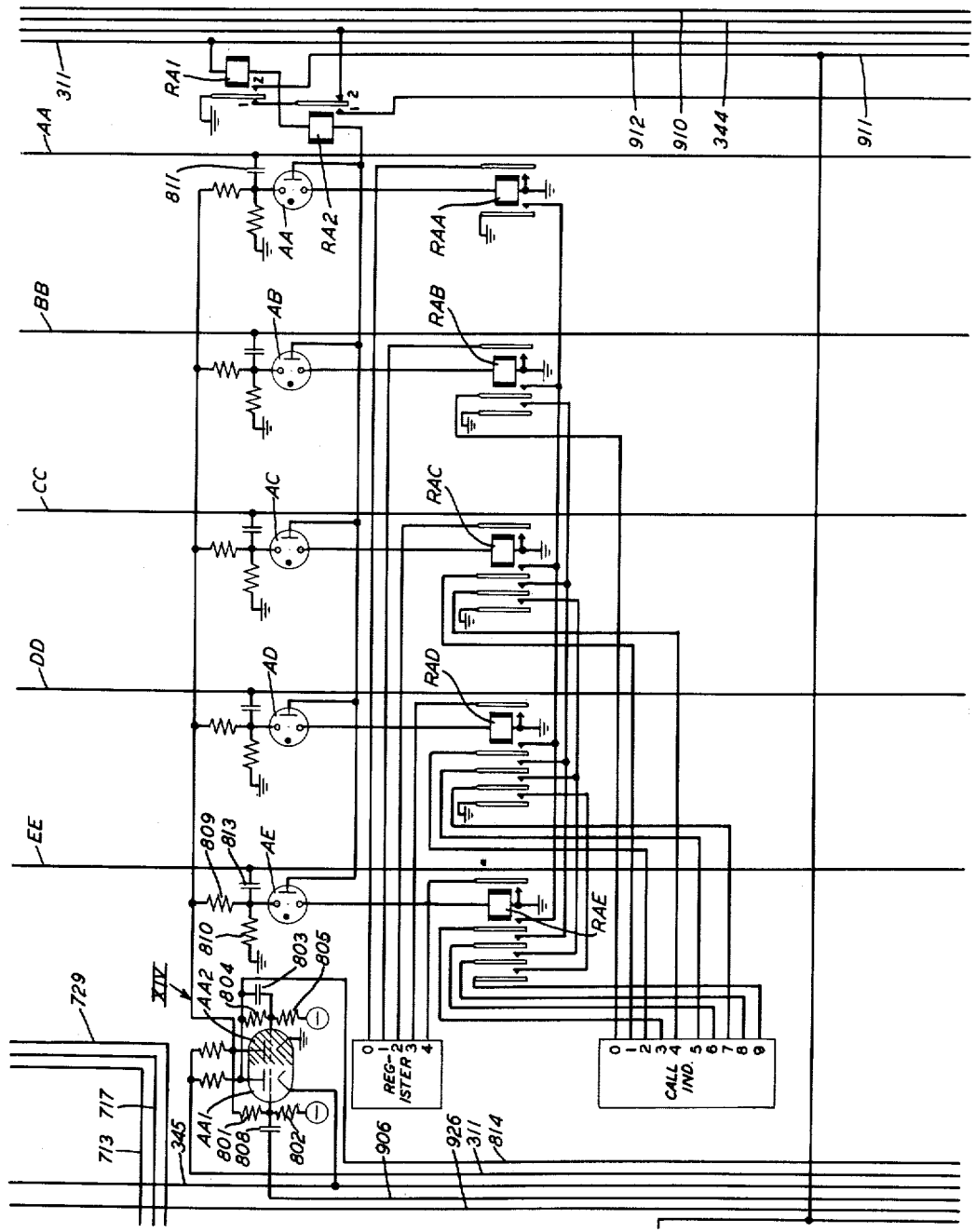

2,966,659

SIGNALING SYSTEM

Carl A. Dahlbom, Greenlawn, and Allan Weaver, Port Washington, N.Y., assignors to Bell Telephone Laboratories, Incorporated, New York, N.Y., a corporation of New York Filed Dec. 30, 1953, Ser. No. 401,192

17 Claims. (Cl. 340—171)

This invention relates to signaling systems.

An object of this invention is to increase the rapidity with which alternating-current signals may be received and registered.

Another object of this invention is to reduce the sensitivity of an alternating-current receiver to non-information carrying signals such as noise.

A feature of this invention is a means for receiving a digit-representing signal comprising a pair of sequentially transmitted alternating-current signals.

A further feature of this invention is a means for receiving a digit-representing signal comprising a pair of sequentially transmitted alternating-current signals having an equal magnitude of frequency deviation from a base or reference frequency.

Another feature of this invention is a means responsive to one of a pair of alternating-current signals of different frequencies for selecting one of a plurality of groups of devices and responsive to the other of that pair of signals for selecting one or more of the devices within that selected group.

A further feature of this invention is a means for verifying the accuracy of receipt of a pair of alternating-current signals of different frequencies by comparing direct voltages derived by rectification of those signals.

A further feature of this invention is a means for disabling a receiver to operate until a signal of a preselected frequency has been received.

Another feature of this invention is a means for disabling a receiver to respond to signals additional to the signal or signals representing the last digit of a designation.

A further feature of this invention is a means for detecting which in a numbered series of conducting and non-conducting electron discharge devices is the highest numbered one of those devices to be conducting.

The manner of attaining the foregoing and other objects of the invention and the nature of the itemized and other features may be perceived from the following detailed description of one embodiment of the invention when read with reference to the accompanying drawings in which:

Fig. 1 shows the method of orienting Figs. 2 to 9 of the drawings;

Fig. 2 shows a representative transmitter capable of sending signals of the required characteristics and capable of responding to signals transmitted from the receiver;

Fig. 3 shows the input portion of a receiver constructed in accordance with the principles of the invention, particularly disclosing the means for developing control voltages which are functions of the frequencies of the incoming signals and the means for developing trains of control pulses;

Fig. 4 shows a first portion of the temporary register and of the translating means;

Fig. 5 shows a second portion of the temporary register and translating means shown in Fig. 4;

Fig. 6 is a graph showing the relationship between the incoming signal frequencies and the voltages developed on certain control conductors by the apparatus of Fig. 3 in response to the receipt of those signal frequencies and further discloses the nature of the operation of the temporary register disclosed in Figs. 4 and 5;

Figure 9:
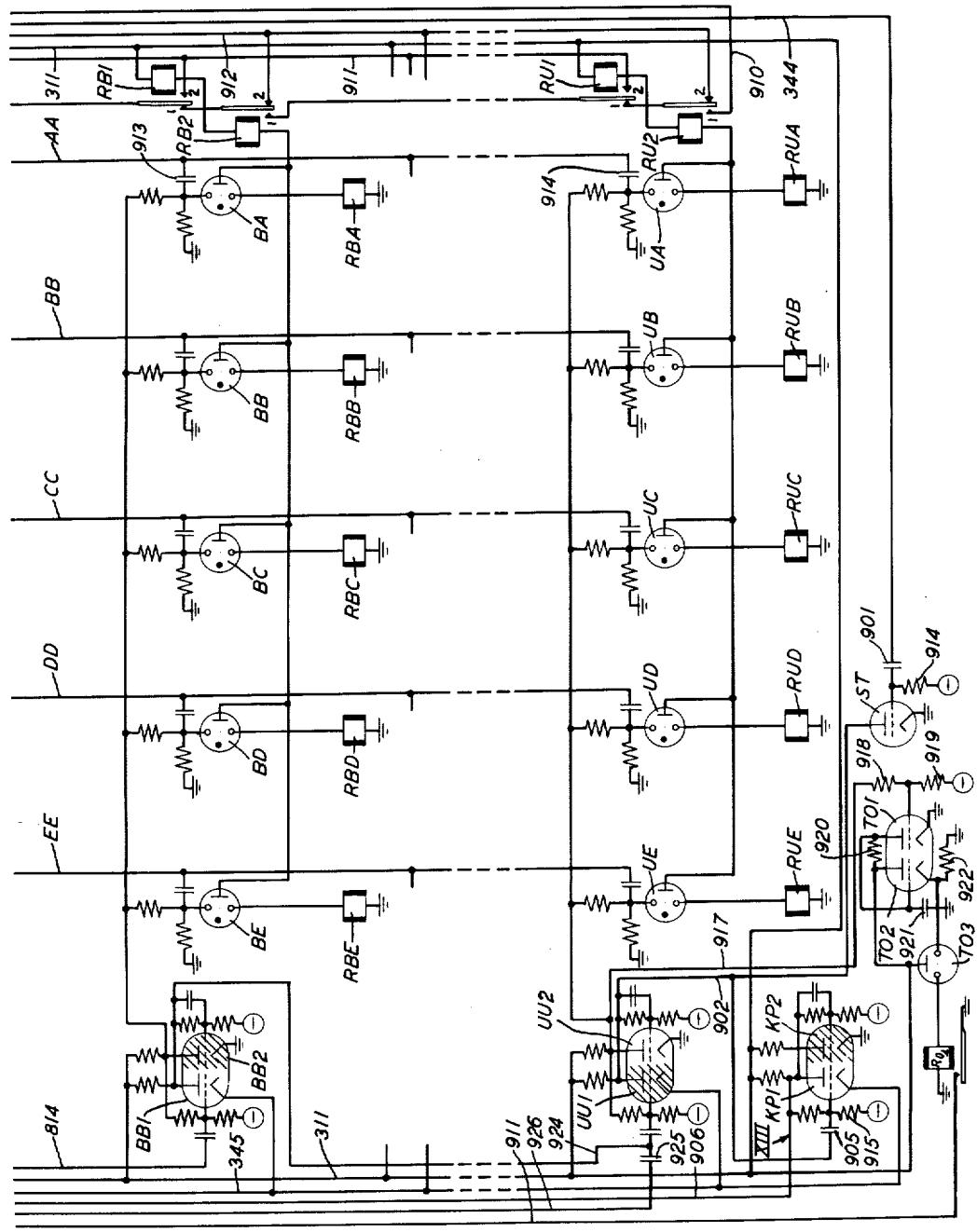
Figure 10:
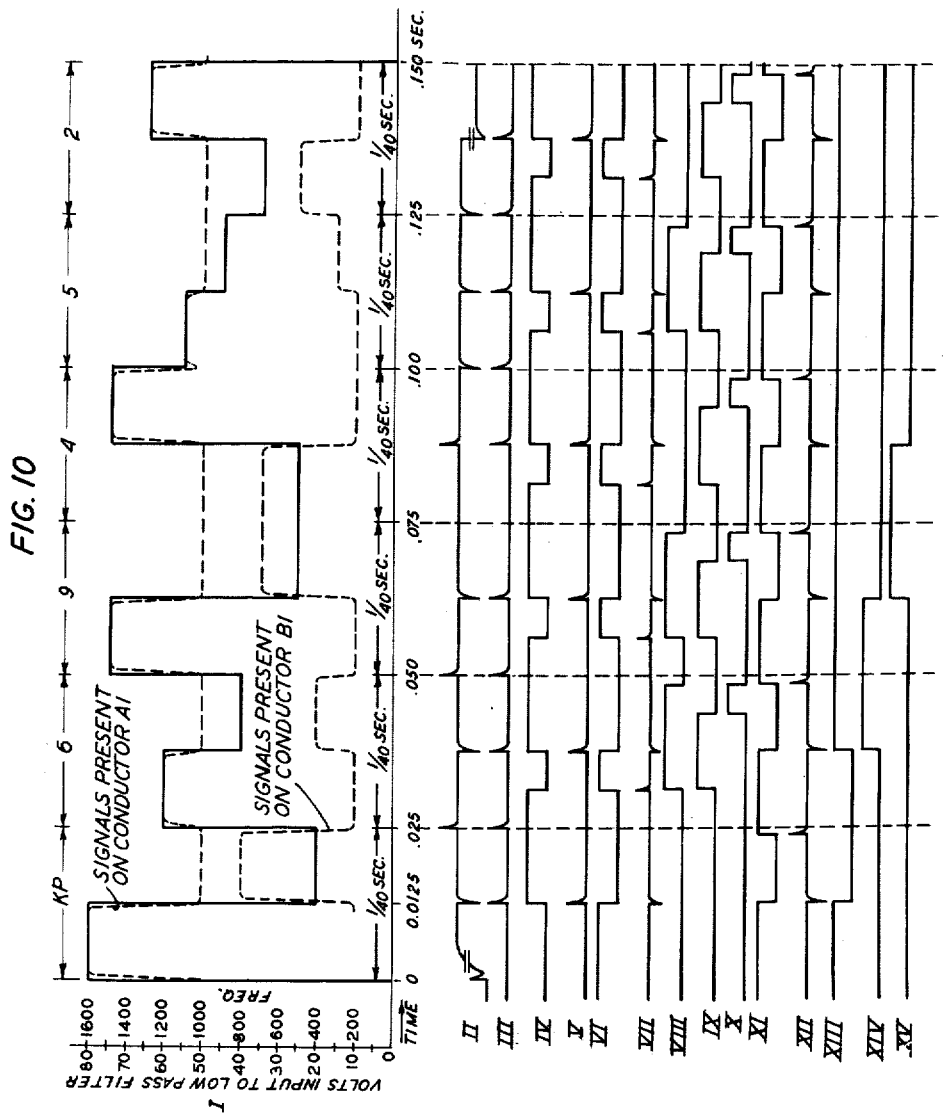

Fig. 7 discloses certain additional control mechanisms including means for controlling the translation operation and means for verifying the proper receipt of the incoming signal frequencies;

Fig. 8 shows a first portion of the digit register and of the digit-register stepping chain;

Fig. 9 shows another portion of the digit register and digit-register stepping chain shown in Fig. 8, as well as certain additional checking means; and Fig. 10 is a graph showing certain critical voltage-time relationships for the apparatus disclosed in Figs. 3 to 5 and 7 to 9.

In the exemplary signaling system disclosed, wire communication has been employed, but it is to be understood that the transmitter of Fig. 2 may be employed as a modulator of a radio-frequency carrier and that the receiver may include means for receiving radio signals and means for demodulating those signals.

Under the exemplary wire communication system disclosed, it is further assumed that certain conventional apparatus, not shown, is provided, including a call indicator or a register or similar apparatus, as well as a trunk circuit, or equivalent apparatus, having a means for operating the off-normal relay in the register to prepare the register for operation and to release the register after it has performed its functions.

In the disclosed system, each letter or digit of a telephonic or other designation is represented by the sequential transmission of a pair of alternating-current signals. The digits are transmitted at a rate of 40 per second, each of the two signals representing a digit being transmitted for one eightieth of a second. There are preferably no idle intervals during the transmission of a digit or of a series of digits. The two alternating-current signals representing any one digit are preferably in the audio-frequency range, particulary if conventional telephonic channels are to be employed. The two signals representing each digit are of different frequencies one from the other and are selected to have an equal magnitude of deviation from a base or reference frequency. Thus, using a 1000-cycle-per-second frequency as a base or reference frequency, the digits may be represented by the following frequencies fulfilling that requirement.

| Digit: | Frequencies, cycles per second |
|---|---|
| 0 | 900–1100 |
| 1 | 800–1200 |
| 2 | 700–1300 |
| 3 | 600–1400 |
| 4 | 500–1500 |
| 5 | 1100–900 |
| 6 | 1200–800 |
| 7 | 1300–700 |
| 8 | 1400–600 |
| 9 | 1500–500 |

Additionally, in order to insure that the receiver does not respond to noises in the audio-frequency range or to speech, the transmission of the alternating-current signals representing the digits of a designation is preceded by a primary or "key pulsing" signal which comprises a first signal frequency of 1600 cycles a second, transmitted for one eightieth of a second, followed by a 400-cycle-per-second signal transmitted for a similar period. It will be noted that this key pulsing or "KP" signal also comprises two frequencies having an equal magnitude of deviation from a 1000-cycle-per-second base frequency.

In the following description of the details of the circuits shown in Figs. 2 to 5 and 7 to 9 of the drawings, certain of the apparatus elements will be designated by a literal combination having functional significance, and this designation will be followed by a number in parenthesis representing the number of the figure upon which the element of apparatus appears. Others of the apparatus elements will be represented by a three-digit number, the hundreds digit of which will be the same as the figure number upon which the element appears.

Referring now to the transmitter shown in Fig. 2 of the drawings, a conventional key set KS(2) is provided comprising a series of 10 keys for each digit which is to be transmitted. Thus, key set KS(2) comprises a first set of 10 keys for the "A" digit, a second set of 10 keys for the "B" digit, a plurality of intermediate sets of 10 keys, and a final set of 10 keys for the "U" or units digits of the designation. For convenience in description, it is assumed that the disclosed system operates on a 5-digit designation, but it will be obvious from the ensuing description that the system may readily be expanded to accommodate 7-digit or 10-digit codes if required.

Each of the keys in the key set KS(2) is individual to a corresponding register relay in the register REG(2). Thus, for example, each of the 10 keys which are employed for registering the "A" digit of the designation is individual to one of 10 relays A0(2) to A9(2). When any one of the keys in key set KS(2) is depressed, it completes a circuit from ground through that key, through the winding of the associated register relay, to negative battery to operate that associated register relay. Each of the register relays, in operating, completes a locking path from negative battery through its own winding and its No. 1 make contact to conductor 203 and back contact of relay OKS(2) to ground. Consequently, as the operator enters the designation which is to be transmitted upon the key set KS(2), the appropriate relays in register REG(2) are operated and locked to store that designation.

Each of the register relays is provided with two signaling contacts, each of which is connected to an appropriate frequency source such as an electronic or mechanical oscillator. These connections are made in accordance with the foregoing code, with the No. 2 contact being connected to a frequency source appropriate to the first of the two signal frequencies representing that particular digit and with the No. 3 contact being connected to a frequency source appropriate to the second signal frequency representative of that particular digit. Thus, for example, the No. 2 contact of relay A0(2) is connected to an alternating-current source which produces a 900-cycle-per-second signal, and the No. 3 contact of relay A0(2) is connected to an audio-frequency generator operating at 1100 cycles per second. As may be seen from the foregoing table, a 900-cycle-per-second signal followed by an 1100-cycle-per-second signal is representative of the digit "0."

The No. 2 contacts of the "A" register relays A0(2) to A9(2) are multiplied, as are the No. 3 contacts of those relays. Similarly, the No. 2 contacts and the No. 3 contacts of each of the other groups of relays are connected in multiple, respectively. Consequently, there are two output leads for each of the register elements, or, with the exemplary 5-digit code, 10 output leads from the register REG(2). These leads are connected in proper sequence to the segments of a start-stop distributor SSD(2) of the type conventionally employed in start-stop telegraphy. Thus, the lead from the No. 2 contacts of the "A" register relays A0(2) to A9(2) are connected to segment A1(2) of the start-stop distributor SSD(2), the No. 3 contacts of the "A" register relays A0(2) to A9(2) are connected to segment A2(2) of the start-stop distributor SSD(2), the No. 2 contacts of the "B" register relays B0(2) to B9(2) are connected to segment B1(2) of distributor SSD(2), and so forth.

The start-stop distributor SSD(2) comprises an outer series of segments such as A1(2), A2(2), etc. and an inner commutating ring 204. An arm 205 is pivoted about a rod which is coaxial with the segmental ring and the commutating ring 204, and is provided with a brush 206 which bridges those two rings in the well-known fashion. Arm 205 is driven by means of a motor and clutch assembly (not shown) which are constantly operating, but the arm 205 is restrained from motion by means of a starting electromagnet SS(2) which includes a pawl member 210 engaging the arm 205. At any time that magnet SS(2) is operated, pawl 210 will be moved to release arm 205 so that the motor and clutch assembly may drive the arm 205 in a clockwise direction, as shown.

Starting magnet SS(2) is only momentarily operated, so that pawl 210 will have restored to its normal position prior to the time that arm 205 has completed one revolution. After arm 205 completes one revolution it is restrained from commencing a second revolution until such time as magnet SS(2) is again operated. It is obvious that the motor must be geared appropriately so that the brush 206 will pass over each of the segments such as segment A1(2) in one eightieth of a second under the exemplary signal transmission speed. It will further be recognized that the insulating elements dividing the several segments such as A1(2) and A2(2) should be as narrow as possible to avoid any significant interruption in signal transmission.

As was before stated, the transmission of digit-representing signals is preferably preceded by a "KP" signal comprising an appropriate pair of frequencies. Therefore, alternating-current sources 212 and 213 are connected to segments KP1(2) and KP2(2) of the start-stop distributor SSD(2) so that the brush 206 will first contact these segments, thereby first connecting generator 212 through segment KP1(2) to ring 204, then connecting generator 213 through segment KP2(2) to ring 204, followed by connection of the selected digit signal generators during each revolution of arm 205.

As before stated, it is assumed that when signal transmission is to occur, the appropriate receiver, one of which is represented in Figs. 3 to 5 and 7 to 9 of the drawings, is seized by a supervisory circuit. As will be described hereinafter, upon being so seized, the receiver will become prepared to receive signals and will then transmit via the trunk circuit and to the transmitter shown in Fig. 2, an alternating-current signal of a selected frequency representing that the receiver is ready to receive information, i.e., a "receiver ready" signal.

This signal, appearing on conductors 201 and 202, will be blocked by band-pass filters BPF1(2) and BPF3(2) but will be passed by band-pass filter BFP2(2), and rectified by varistor VRB(2). The resulting direct voltage is amplified by amplifier AMP2(2) and applied to the winding of relay RRS(2), whereupon relay RRS(2) is operated to indicate to the transmitter that the receiver is prepared to receive signals. Relay RRS(2), in operating, locks operated from negative battery through its winding and through its No. 1 contact, conductor 216 to ground at start key ST(2). Relay RRS(2), in operating, operates slow-to-release relay SR(2).

Since the receiver is electronic, the receiver will be prepared for transmitting the "receiver ready" signal prior to the time that the operator will have completed entering the designation on key set KS(2). At such time as the entering is complete, the operator will operate start key ST(2) to interrupt the locking path for relay RRS(2). Since the "receiver ready" signal is transmitted for a very short period, as will be described hereinafter, the operating potential for relay RRS(2) will also have been removed, so that relay RRS(2) will release. In releasing, relay RRS(2) will interrupt the operating path for relay SR(2), but since relay SR(2) is slow to release, it will continue to be operated for a brief interval following the release of relay RRS(2). During this interval, ground is applied through the front contact of relay SR(2), through the No. 3 back contact of relay RRS(2), through the winding of magnet SS(2) to negative battery so as momentarily to operate magnet SS(2). Magnet SS(2), in operating, releases arm 205 so that it will commence its revolution, successively connecting the several segments KP1(2) to U2(2) to the commutating ring 204. The signals appearing on commutating ring 204 are applied to the output conductors 201 and 202 by means of conductor 215 and transformer 218. Prior to the time that arm 205 has completed its revolution, relay SR(2) will release to release magnet SS(2) so that pawl 210 is restored to stop arm 205 at the completion of a single revolution.

In this fashion, the two frequencies comprising the "KP" signal are sequentially transmitted followed by a sequential transmission of the paired frequencies representing the digits of the designation.

After completing a single revolution, the transmitter will remain in this condition until such time as it receives either a "reorder" signal or an "OK" signal from the receiver. If the receiver does not properly register the transmitter designation, it will operate in a fashion hereinafter to be described to transmit to the transmitter a "reorder" signal. This signal will be blocked by band-pass filters BPF1(2) and BPF(2) but will be passed by band-pass filter BPF(3) and rectifier by varistor VRC(2). The resultant voltage is amplified by amplifier AMP3(2) and applied to the winding of relay ROS(2) to operate that relay. Relay ROS(2), in operating, applies ground through its front contact to operate the starting magnet SS(2) to again release arm 205 to initiate the retransmission of the designation. Since the "reorder" signal is of short duration, prior to the time that arm 205 has completed a full revolution, the signal will have terminated, releasing relay ROS(2) whereupon starting magnet SS(2) will be released to prevent arm 205 from commencing a further revolution.

When the register, to which the digit signals are transmitted, has operated to properly record the transmitted signals, it will transmit a third frequency, known as an "OK" signal, to the transmitter via conductors 201 and 202, in the manner hereinafter described. This signal will be blocked by band-pass filters BPF2(2) and BPF3(2) but will be passed by band-pass filter BPF1(2) and rectified by varistor VRA(2). The resulting voltage is amplified by amplifier AMP1(2) and applied to operate relay OKS(2). Relay OKS(2) in operating, removes the ground from conductor 203 to release register REG(2) to thereby restore the transmitter to normal in preparation for future use.

It is to be recognized that the disclosed transmitter is greatly simplified to expedite description. The use of fully electronic control circuits and an electronic commutator lies within the contemplation of the invention.

Referring now to Figs. 3 to 5 and 7 to 9 of the drawings, the receiver is seized for operation by the grounding of conductor 220 from a trunk circuit or other control instrumentality external of the receiver, which causes the the operation of relay ON(3). Relay ON(3) completes an operating circuit for relay RR(3) from negative battery, No. 3 front contact of relay ON(3), winding of relay RR(3), to ground at the back contact of relay RR1(3). Relay RR(3), in operating, connects the trunk conductors 221 and 222 through its Nos. 2 and 3 contacts to audio-frequency generator RRF(3). The generator RRF(3) transmits an audio-frequency "receiver ready" signal connoting that the receiver is prepared to receive information. The signal transmitter of Fig. 2 responds to this signal in the previously described manner.

Relay ON(3), in operating, also applies positive battery through resistor 303 and through its No. 2 front contact to the upper electrode of capacitor 304, the lower electrode of which is grounded, whereby an exponentially rising potential will be applied to the control grid of vacuum tube RR1(3). When this potential has risen to a sufficiently high value, the plate current from positive battery, No. 7 contact of relay ON(3), winding of relay RR1(3) through the space-discharge path of tube RR1(3) and through the cathode resistor of that tube to ground will be adequate to operate relay RR1(3). Relay RR1(3), in operating, interrupts the previously traced energizing path for relay RR(3) whereupon relay RR(3) releases to interrupt the transmision of the "receiver ready" signal to the sender. Relay RR(3), in releasing, connects the trunk conductors 221 and 222 through its Nos. 1 and 4 back contacts, respectively, Nos. 1 and 4 back contacts of relay OK(3), conductors 307 and 308, Nos. 4 and 7 back contacts of relay RO(3) to the terminals of the primary winding of transformer T1(3). Relay ON(3), in operating, also connects positive battery through its No. 7 front contact to conductor 310 to supply plate potential to the tubes shown on Figs. 3 to 9.

The audio-frequency signals transmitted by the sender are applied over the previously traced path to the primary winding of transformer T1(3). The resultant alternating-current signals appearing at the secondary winding of transformer T1(3) are applied through resistor 312 to control grid of pentode A(3). If the incoming signal is of a low amplitude, it is highly amplified by pentode A(3) and applied through capacitor 313 and resistor 314 to the grid of triode B(3). If the positive swings of the incoming signal are of sufficient amplitude, as they should normally be, those positive peaks will be clipped due to action of the grid limiting resistor 312. Similarly, if the negative swings of the incoming signal are sufficiently great, those negative peaks may also be clipped due to the fact that pentode A(3) is driven below grid cut-off.

The signal applied to the control grid of triode B(3) is of sufficient amplitude, due to the action of pentode A(3), so that at least its positive peaks will be clipped due to the action of grid-limiting resistor 314. Additionally, the negative peaks may also be clipped if tube B(3) is driven below grid cut-off. Therefore, the signal applied through capacitor 315 to the control grid of tube C1(3) will normally be clipped on both its positive and negative peaks. Since both tubes A(3) and B(3) normally clip the positive peaks of the signals applied thereto and since the phase of the incoming signal is inverted by tube A(3), the total output wave will have both peaks clipped even though the incoming signal be of insufficient amplitude for tube A(3) to clip the negative peaks.

The amplifying-limiting stage comprising tube C1(3) and C2(3) consists of a cathode follower followed by grounded grid amplifier whereby amplification is provided without phase inversion. Since tubes C1(3) and C2(3) are substantially overdriven, the output wave form, applied through capacitor 316 to the grid of tube D1(3), approximates a square wave in shape. It will therefore be seen that tubes A(3) to C2(3) constitute a four-stage amplifier-limiter providing a substantially square-wave output of closely controlled amplitude. This output is applied to the circuit including tubes D1(3) and D2(3) which are a conventional form of the so-called single-shot, self-restoring, or monostable multivibrator. The anode of the left-hand tube D1(3) is coupled to the control grid of the right-hand tube D2(3) by means of capacitor 317 and resistor 318, and the anode of the right-hand tube D2(3) is coupled to the control grid of the left-hand tube D1(3) by means of resistors 319 and 320. The monostable multivibrator comprising tubes D1(3) and D2(3) operates as a frequency counter, making a complete cycle of operation at each negative-to-positive transition of the incoming signal. Since the right-hand section is normally conducting as indicated by the diagonal line shading, this means that the output of the monostable multivibrator will consist of one positive-going square-wave pulse for each cycle of the incoming signal. The duration of each of these square-wave pulses will be determined by the restoration time of the multivibrator, i.e. the time required for capacitor 317 to discharge to a prescribed level.

The parameters of the circuits should be so selected that tube D2(3) will not be constantly conducting at the highest frequency of the received signals and so that tube D2(3) will not be constantly cut off at the lowest frequency of the received signals. As for example, the parameters may be selected so that the restoration time of this monostable multivibrator is equal to one-half of the period of the 1000-cycle-per-second median frequency, i.e., a restoration time of .0005 second. With this restoration time and with a 1000-cycle-per-second input signal, the average direct potential at the anode of tube D2(3) would be approximately the average between the potential of that anode at full conduction and the potential of that anode at cut-off since tube D2(3) will be at saturation and at cut-off for approximately equal periods during each cycle. At any input signal frequency greater than 1000 cycles per second (up to a maximum of 2000 cycles per second under the assumed conditions), the average direct potential at the anode of tube D2(3) will be greater than that at 1000 cycles per second since the restoration time will be greater than one-half of the period of the then incoming signal so that tube D2(3) will be at cut-off more than it will be at saturation during each cycle of its operation. Conversely, at any input signal frequency less than 1000 cycles per second (down to a minimum of zero cycles per second under the assumed conditions), the average direct potential at the anode of tube D2(3) will be less than that at 1000 cycles per second since the restoration time will be less than one-half of the period of the incoming signal so that tube D2(3) will be at saturation more than it will be at cut-off during each cycle of its operation.

These positive-going square-wave pulses at the anode of tube D2(3) are applied through cathode follower E1(3) to a low-pass filter LP1(3). The low-pass filter LP1(3) preferably has a low cut-off characteristic of approximately 100 cycles per second so that the output of filter LP1(3) will consist of signals having an amplitude dependent upon the frequency of the incoming signal. Thus, cathode follower E1(3) in cooperation with the low-pass filter LP1(3) serves essentially the function of an infinite impedance detector.

The operation of the circuits to this point may also be comprehended by reference to the considerably idealized solid line curve I of Fig. 10 which represents the potential at the output of the low-pass filter LP1(3), i.e., the potential on conductor 323 resulting from the reception of an exemplary series of signals: KP (1600 and 400 cycles per second), 6 (1200 and 800 cycles per second), 9 (1500 and 500 cycles per second), 4 (500 and 1500 cycles per second), 5 (1100 and 900 cycles per second), and 2 (700 and 1300 cycles per second). The abscissa of the curve is in units of time, the major divisions representing a time interval of .025 second which is the period of the 40-cycle-per-second signal transmission rate. As was hereinbefore described, the first of the two frequencies (1600 cycles per second) representing the KP signal is received in the first .0125 second, the second frequency (400 cycles per second) representing the KP signal is received during the second .0125 second, etc. The ordinate of the curve is divided into exemplary frequency units and exemplary voltage units, demonstrating that the primary function of the monostable multivibrator comprising tubes D1(3) and D2(3), cathode follower E1(3) and low-pass filter LP1(3) is to produce a direct voltage having an amplitude which is a function of the frequency of the incoming signal. As these frequencies are exemplary, the voltages are but representative of the voltages that might be found on conductor 323 with a given set of circuit parameters.

During the first .0125 second, when the 1600-cycle-per-second signal which forms the first half of the KP signal is being received, the input sine-wave signal will go through 20 cycles so that 20 positive-going square-wave pulses will be generated at the anode of tube D2(3). The amplitude of the resulting square-wave pulses at the cathode of tube E1(3) will be somewhat in excess of 80 volts under the assumed conditions, but the average value of these square-wave pulses (approximately the value of the potential on the conductor 323) is representatively taken as 80 volts. During the second .0125 second when the input sine wave has a frequency of 400 cycles per second representing the second half of the KP signal, the input sine wave will complete 5 cycles so that 5 positive-going square-wave pulses will appear at the anode of tube D2(3) and at the cathode of tube E1(3). While the amplitude of the square-wave pulses will be considerably greater than 20 volts positive, the average value thereof (the value of the potential on conductor 323) will be 20 volts in the example shown. The succeeding frequencies will be similarly converted to a direct voltage having an amplitude proportional to each of those frequencies.

It should be noted that a characteristic of every transmitted signal representing a complete digit is that it passes through the voltage point, corresponding to the base or median frequency of 1000 cycles per second, at the center of the signal.

The potential on conductor 323 is applied to the control grid of a split-load phase inverter E2(3), the output of the anode of which is directly coupled to the control grid of cathode follower F1(3) and the output of the cathode of which is directly coupled to the control grid of cathode follower F2(3). The output leads from the cathode followers F1(3) and F2(3) are labeled B1 and A1, respectively. The plate and cathode resistors of the split-load phase inverter E2(3) are selected so that when there is applied to the control grid thereof a voltage (exemplarily 50 volts) representative of the base or median input frequency of 1000 cycles per second, the voltages appearing on conductors A1 and B1 will be equal. When the input signal is at a frequency greater than 1000 cycles per second, the voltage on conductor 323 will be greater than when the input signal is 1000 cycles per second so that the voltage at the anode of tube E2(3), at the cathode of tube F1(3) and therefore on conductor B1 will be less, and so that the potential at the cathodes of tubes E2(3) and F2(3) and therefore on conductor A1 will be higher than they would be at the receipt of a signal of the base or median frequency. The converse is true when the input signal is of a frequency lower than 1000 cycles per second.

Thus, the direct voltage on conductor B1 is an inverse function and the voltage on conductor A1 is a direct function of the frequency of the incoming signal. The dotted-line curves I in Fig. 10 indicate the nature of the signals that will appear on conductors A1 and B1 for the incoming signals illustrated. The signals on conductor B1 are similar to but out of phase with respect to those on conductor A1 by one-half cycle of the digit transmitting speed. It should be noted that the base lines for the dotted-line curves are arbitrary and not necessarily related to the base line of the solid-line curve.

The output conductors A1 and B1 are connected to two groups of channel tubes which, in the disclosed embodiment of the invention, are assumed to be gas-filled, hot cathode tetrodes, or thyratrons. Conductor A1 is connected through individual resistors such as resistor 401 to the control grids of a first or "A" group of thyratrons G0(4), G1(4), G2(4), G3(4) and G4(4); and conductor B1 is connected through individual resistors such as resistor 501 to the control grids of a second or "B" group of thyratrons G5(5), G6(5), G7(5), G8(5) and G9(5). The grid circuit of each thyratron is connected to an individual voltage divider set at a different value of bias voltage for each of the tubes in each of the groups. Thus, the control grid of tube G0(4) is connected to ground through resistor 403 and is connected to negative battery through resistor 402, the values of resistors 402 and 403 being selected so that tube G0(4) is biased but slightly negative. Similarly, the control grid of tube G1(4) is connected to ground through resistor 406 and to negative battery through resistor 405, the values of resistors 405 and 406 being selected so as to bias tube G1(4) somewhat more negative than is tube G0(4). Tubes G2(4), G3(4) and G4(4) are progressively biased more negative. Similarly, the control grid of tube G5(5) is connected to ground through resistor 503 and to negative battery through resistor 502 and via conductor 404, the values of resistors 502 and 503 being selected so that tube G5(5) is biased but slightly negative, i.e., the same order of bias as tube G0(4). Tubes G6(5), G7(5), G8(5) and G9(5) are progressively biased more negatively. These several biases are selected in consideration of the parameters of the cooperating circuits so that tube G0(4) will be discharged (assuming plate potential to be supplied) when there is applied to conductor A1 any direct voltage equal to or greater than the voltage developed upon the receipt of an 1100-cycle-per-second signal, so that tube G1(4) will be similarly discharged upon the application to conductor A1 of a direct voltage equal to or in excess of the direct voltage resulting from the receipt of a signal of a 1200-cycle-per-second frequency, and so that tubes G2(4), G3(4) and G4(4) will be similarly discharged upon the application to conductor A1 of a direct voltage equal to or in excess of the voltage resulting from the receipt of a signal of 1300 cycles per second, 1400 cycles per second, or 1500 cycles per second, respectively. Thus, upon the receipt of an 1100-cycle-per-second signal only tube G0(4) will be discharged, while upon the receipt of a 1500-cycle-per-second signal all of the tubes G0(4) to G4(4) will be discharged.

The progressively increasing negative bias of tubes G5(5) to G9(5) results in those tubes being responsive to progressively lower-frequency input signals. Thus, tube G5(5) will be discharged (assuming plate voltage to have been supplied) upon the application to conductor B1 of a direct voltage resulting from the receipt of a signal of a frequency of 900 cycles per second or less, tube G6(5) will be discharged upon the application to conductor B1 of a direct voltage resulting from the receipt of an input signal of 800 cycles per second or less, tube G7(5) to a signal of 700 cycles per second or less, tube G8(5) to an input signal of 600 cycles per second or less, and tube G9(5) to an input signal of 500 cycles per second.

The relationship between the frequency of the incoming signal, the level of the direct voltage on conductor A1 or B1 resulting from the receipt of that signal, and the incrementally varied negative bias on the several channel tubes G0(4) to G9(5) may also be perceived by reference to Fig. 6 of the drawings. Fig. 6 shows a pair of curves plotted to an abscissa of the frequency of the incoming signal in cycles per second and to an ordinate of the voltage output, one curve representing the voltage appearing on conductor A1, and the other curve representing the voltage on conductor B1. It will be perceived from these curves, as was previously described, that the voltage on conductor A1 is a direct function of the frequency of the incoming signal whereas the voltage on conductor B1 is an inverse function of the frequency of the incoming signal. There is additionally represented upon the curves the points at which the several channel tubes G0(4) to G9(5) will fire, assuming plate potential to be applied to those tubes. The firing points of channel tubes G0(4) to G4(4) are marked on the curve representing the voltage on conductor A1 since it is that conductor to which those tubes are connected, and similarly the firing points of tubes G5(5) to G9(5) are marked on the curve representing the voltage on conductor B1.

It will be recalled that the signal representing each digit consists of two successive frequencies symmetrical about a 1000-cycle-per-second base frequency. The circuits are arranged so that the first of these frequencies controls which of the two groups of channel tubes is to be permitted to fire, i.e., to which of the groups plate potential is to be applied, and so that the second of these frequencies controls the selective discharge of the tubes within the selected group. To provide for these and other control functions, the output from the low-pass filter LP1(3) is applied via conductor 323 to the control grid of amplifier K(3). The abrupt change in plate potential of tube K(3) resulting from the transition of the voltage on conductor 323 from one value to another value (see curve I on Fig. 10) is differentiated by means of capacitor 324 and resistor 325 and applied to the control grid of cathode follower L1(3). Tubes L1(3) and L2(3) are connected as a cathode follower followed by a grounded grid amplifier in the same manner as tubes D1(3) and D2(3), previously described, and therefore serve to produce an essentially square wave output.

The output of tube L2(3) is differentiated by means of capacitor 326 and resistor 327 and applied to the control grid of triode M(3). Tube M(3), however, is biased so far below cut-off that it will be insensitive to these received signals. Upon the application of an enabling potential to the grid of tube M(3), however, tube M(3) will be conditioned to amplify these input signals. The presence or absence of this enabling potential at the grid of tube M(3) is controlled by tubes J1(3) and J2(3) which are part of a guard circuit serving to prevent the generation of a signal at the first transition of the KP signal, i.e., at the instant that the KP signal is first received. In the absence of a received signal, tube J1(3) is conducting to such a limited degree that its cathode is substantially at ground potential, and the application of this potential through resistor 331 to the control grid of tube M(3) is not sufficient to enable tube M(3) to respond to the input signals applied thereto.

However, upon the receipts of the first signal (the first of the two frequencies representing the KP signal), a plurality of square wave pulses will appear on conductor 322, those pulses having a positive average direct voltage value approximating that shown in curve I of Fig. 10. The potential on conductor 322 is applied through varistor or rectifying unit VR1(3) and resistor 329 to one electrode of capacitor 330, the other electrode of which is grounded. Therefore, during the receipt of this first signal (and continuously thereafter while signaling continues), capacitor 330 will be charged to a voltage which, when applied to the control grid of tube J1(3), will cause that tube to conduct. The parameters of this time-delay network should preferably be somewhat less than the period of one-half cycle of the signal transmission speed, e.g., 5 milliseconds. The resultant rise in the cathode potential of tube J1(3), when applied through resistor 331 to the control grid of tube M(3), is of sufficient value to enable tube M(3) to respond to the pulses applied thereto through capacitor 326. For a reason hereinafter to be noted, the circuit values should be selected so that tube J1(3) will enable tube M(3) only upon the receipt of the KP signal. This is conveniently arranged by selecting the highest used frequency, 1600 cycles per second in the disclosed embodiment, as the first frequency of the KP signal and by setting the biases so that tube J1(3) will enable tube M(3) only upon the application to the grid thereof of a direct voltage of the amplitude produced by this highest-frequency signal.

The variation of the voltage at the grid of tube M(3) with respect to time is shown in curve II on Fig. 10. The signal applied to that grid from the anode of tube L2(3), after differentiation, is a series of spikes of alternating polarity separated by a time interval equal to one-half of the period of the signal transmission speed. The reference level for these pulses is controlled, however, by the voltage at the cathode of tube J1(3), as before indicated. This reference level is initially low, as is shown for the first pulse of curve II, but immediately after that first pulse the reference level rises to a value adequate to permit operation of tube M(3).

The output of tube M(3) is applied through capacitor 334 and through transformer T3(3) to a full wave rectifying unit RE1(3). The output of the rectifying unit RE1(3), appearing across resistor 335, is shown on curve III of Fig. 10. These output pulses are applied through capacitor 336 to the control grid of tube N1(3). Tubes N1(3) and N2(3) are arranged as a monostable multivibrator similar to the circuit comprising tubes D1(3) and D2(3). Since tube N1(3) is normally cut-off, upon the application of a positive pulse to the control grid thereof, it will become conductive, whereupon tube N2(3) will be driven below cut-off. After an appropriate period, the monostable multivibrator will restore to its initial condition. The time constant or restoration time of the multivibrator comprising tubes N1(3) and N2(3) is preferably selected so that the generated output signal is approximately equal to three-quarters of the period of the basic signal transmitting speed, e.g., .01875 second. The resultant output wave form at the anode of tube N2(3) is shown as curve IV of Fig. 10, and the resultant output signal at the anode of tube N1(3) is shown as curve VI. As a result of this restoration time, the monostable multivibrator comprising tubes N1(3) and N2(3) will be triggered only by the odd pulses applied thereto from the rectifying unit RE1(3) since it will not have restored to normal prior to the receipt of the even pulse but it will have restored prior to the receipt of the next odd pulse, and so on. This may be perceived by comparison of curves IV and VI, representing the output voltages, to curve III, representing the input signal. The output voltage at the anode of tube N2(3) (curve IV) is differentiated by means of capacitor 337 and resistor 338 and applied to cathode follower P(3). The resulting voltage appearing across cathode resistor 339 of tube P(3) is shown in curve V of Fig. 10. These pulses, it will be noted, occur at the middle of each incoming digit and are employed as the basic timing and stepping pulses as will be described hereinafter.

The voltage on conductor 342 and at the anode of tube N1(3) (curve VI) is differentiated by means of capacitor 703 and resistor 704 and applied to the control grid of tube R(7), is differentiated by capacitor 706 and resistor 707 and applied to the control grid of tube T(7), and is differentiated by means of capacitor 719 and resistor 720 and applied to the control grid of tube W1(7). The differentiated signal appearing at the control grid of tubes R(3), T(3) and W1(3) is shown in curve VII of Fig. 10. The cathodes of tubes R(7) and T(7) are held at a substantial positive value by means of a potential divider comprising ground, resistors 721 and 723 and the positive potential on conductor 311, and ground, resistors 722 and 724 and the positive potential on conductor 311, respectively. These potential-divider circuits are selected so that neither tube R(7) nor tube T(7) will respond to the previously described input pulses. However, the control grid of tube R(7) is connected through resistor 705 to conductor A1 and the control grid of tube T(7) is connected through resistor 708 to conductor B1.

Therefore, if a voltage of sufficient amplitude is present on conductor A1 at the time that a positive pulse (curve VII) is applied to the control grid of tube R(7), tube R(7) will amplify and invert that pulse and apply it through capacitor 710 to the control grid of the monostable multivibrator comprising tubes S1(7) and S2(7). Since section S1(7) is normally conducting a negative input pulse will drive that section nonconducting, resulting in conduction in tube S2(7). After a preselected interval, this monostable multivibrator will restore. The potential at the anode of tube S1(7) is applied through resistor 711 to the control grid of triode V1(7). The voltage appearing at that control grid is represented in curve VIII of Fig. 10. In comparing the input signals represented in curve VII to the output signals represented in curve VIII, it should be recalled that the signals represented in curve VII are inverted by tube R(7) before they are applied to the monostable multivibrator, that a positive pulse applied to the control grid of tubes S1(7) will be ineffective to produce any change if that tube is already conducting, and that a pulse appearing at the control grid of tube R(7) will be applied to the control grid of tube S1(7) only if a suitable positive potential is concurrently appearing on conductor A1.

The anode of tube V1(7) is connected directly to the positive potential on conductor 311, and the plate and cathode resistors and space-discharge paths of the channel tubes G5(5) to G9(5) serve, in effect, as the cathode load resistor for tube V1(7). Upon the application of a positive signal to the control grid of tube V1(7), the cathode will rise to a substantial positive value which will be applied via conductor 713 and through the several individual load resistors such as resistor 511 to the anodes of tubes G5(5) to G9(5). This voltage at the cathode of tube V1 serves as the source of plate potential for the group "B" channel tubes.

Tubes T(7), U1(7), U2(7) and V2(7) similarly serve to apply plate potential to the group "A" channel tubes if the frequency of the incoming signal is such that conductor B1, rather than conductor A1, is at a suitable positive voltage. Thus, at any time that a positive pulse appears at the control grid of tube T(7) while conductor B1 is at a suitably high positive potential, that pulse will be amplified and inverted by tube T(7) and applied via capacitor 714 to the control grid of tube U1(7) to cut off conduction in tube U1(7) and institute conduction in tube U2(7). After a suitable time interval, the monostable multivibrator comprising tubes U1(7) and U2(7) will restore. The output potential at the anode of tube U1(7) is applied through resistor 715 to the control grid of tube V2(7), and the resultant high positive potential at the cathode of tube V2(7) is applied via conductor 717 and through individual plate load resistors such as resistor 411 to the anodes of the group "A" channel tubes G0(4) to G4(4). Thus, since conductors A1 and B1 are never concurrently at a suitably high potential, only one of the two groups of channel tubes can be enabled by the application thereto of plate potential at any one time. As before stated, the one of those two groups of channel tubes which is to be so enabled, for any one digit, is determined by the frequency of the first of the two signals representing that digit. It will be noted, by reference to curve VIII, that this plate potential is applied to the channel tubes for only a limited period during the transmission of any one digit so that the channel thyratrons will be extinguished at or prior to the time at which the signals representing any digit terminate, so that the channel tubes will be ready for the receipt of the signals representing the next succeeding digit.

With the KP signal having been received, it will be assumed that the next digit transmitted is the digit "6." As previously indicated, the digit "6" is represented by a first signal of a frequency of 1200 cycles per second followed by a second signal of a frequency of 800 cycles per second. During the receipt of the first of these frequencies, a relatively high positive potential will appear on conductor A1 and a much less positive potential will appear on conductor B1, as may be seen by reference to curve I. This positive signal on conductor A1, together with the positive pulse applied to the control grid of tube R(7) (curve VII) during this interval, will trigger the monostable multivibrator comprising tubes S1(7) and S2(7) to render tube V1(7) conducting, to thereby apply plate potential to the group "B" channel thyratrons G5(5) to G9(5), as previously described. During the second half of the period of the basic 40-cycle-per-second signal transmission speed, a positive voltage will be present on conductor B1 and will be applied through individual grid resistors such as resistor 501 to the control grids of the channel tubes G5(5) to G9(5). Since the signal frequency at this instant is 800 cycles per second, it may be seen by reference to Fig. 6 of the drawings that thyratrons G5(5) and G6(5) will be discharged. Therefore, the receipt of the digit "6" is indicated by the fact that thyratron G6(5) is the highest numbered tube which was discharged as a result of the receipt of the frequencies representing that digit.

This somewhat complex temporary registration of the digit is converted to a normal decimal basis by means of the translator tubes H0(4) to H9(5) and by means of networks constituting the grid circuits of each of these translating tubes. The instantaneous voltage of the grid of any one of the translator tubes H0(4) to H9(5) is the algebraic sum of four control voltages; negative battery is applied through an individual resistor such as resistor 413 or resistor 515 to the control grids of each of the tubes; a second potential, which is either a substantial positive value or ground depending upon whether the associated channel thyratron is conducting or non-conducting, is applied from the cathode of the associated channel thyratron G0(4) to G9(5) and through an individual resistor such as resistor 414 or 516 to the control grid of each of the translator tubes H0(4) to H9(5); a third potential, which is either equal to the potential on conductor 311 or is a considerably lower positive value due to the potential drop across the thyratron load resistor if the thyratron is conducting, is applied from the anode of the next higher numbered channel thyratron G0–G9 (with the exceptions hereinafter to be noted) through an individual resistor such as resistor 415 or 517 to the control grid of each of the translator tubes; and a positive pulse is applied via conductor 729 (derived in a manner hereinafter to be described) and through individual resistors such as resistor 417 or 522 to the control grids of each of the translator tubes H0(4) to H9(5). The noted exceptions are in the case of translator tubes H4(4) and H9(5) in which the positive potential appearing on conductors 717 or 713 is applied through individual resistors such as 523 to the control grid of that tube rather than a positive potential being applied from any succeeding channel thyratron. As will be seen, it is not necessary to have this third control voltage variable in the case of tubes H4(4) and H9(5) since if thyratrons G4(4) or G9(5) is discharged there can be no doubt as to the number which is registered.

Each of the translator tubes H0(4) to H9(5) can conduct adequately to perform its function only if the potential applied to its control grid from the cathode of its associated channel thyratron G0–G9 is at the higher of its two voltage levels, only if the voltage applied to its control grid by the anode of the next higher numbered channel thyratron is at the higher of its two values (with the noted exception and exceptions), and only if a positive pulse is applied to conductor 729. The first two of these conditions can be established for but one of the translator tubes at any one time. Thus, assuming channel thyratrons G5(5) and G6(5), and only those thyratrons, to be discharged, neither of those conditions will be met for translator tubes H0(4) to H4(4) and H7(5) to H9(5) since both the channel thyratron individual to each of those translator tubes and the next succeeding higher numbered channel thyratron, with the exception of tubes H4(4) and H9(5), will be nonconducting so that the lower of the two values of potential will be applied to the control grids of those translator tubes by both sources. In the case of translator tube H5(5), since channel thyratron G5(5) is conducting, the higher of the two values of potential of the cathode of that thyratron will be applied through resistor 516 to the control grid of tube H5(5). However, channel thyratron G6(5) is also conducting so that the voltage at the anode of tube G6(5) will be the lower of its two values so that a lower-than-requisite potential will be applied through resistor 517 to the control grid of tube H5(5). Therefore, tube H5(5) will not be adequately conductive to pass or gate a pulse applied to the control grid thereof through resistor 522. However, in the case of translator tube H6(5), the voltage at the cathode of the discharged channel thyratron G6(5) will be at the higher of its two values, and the potential at the anode of the non-discharged channel thyratron G7(5) will be at the higher of its two values so that tube H6(5) is prepared to be rendered conductive upon the application thereto of a positive pulse through resistor 525. Thus, upon the discharging of one or more of the channel thyratrons G0(4) to G9(5) in response to the receipt of signals representing any digit, one and only one of the translator tubes H0(4) to H9(5) will be "primed" so that one and one only will be rendered conductive upon the application of a positive pulse to conductor 729, i.e., no two of the translator tubes H0(4) to H9(5) can be opened concurrently.

The positive pulses appearing on conductor 729 are derived from the monostable multivibrator comprising tubes X1(7) and X2(7). As was before indicated, the pulses shown in curve VII of Fig. 10 appear at the control grid of tube W1(7). Tubes W1(7) and W2(7) constitute a monostable multivibrator of the form hereinbefore described, with section W2(7) normally being conducting. Using the exemplary series of pulses represented in curve VII, the first negative pulse will be ineffective to produce a result since tube W1(7) is already below cut-off. At the first positive pulse, however, and at each positive pulse thereafter, section W1(7) will be rendered conductive, driving section W2(7) below cut-off. After a selectable interval, in the order of one-half of the period of the signal transmission speed, this monostable multivibrator will restore to normal. Consequently, a wave form will appear at the anode of tube W2(7) as represented in curve IX of Fig. 10. This wave is differentiated by means of capacitor 727 and resistor 728 and applied to the control grid of tube X1(7). Tubes X1(7) and X2(7) constitute another monostable multivibrator, having a restoration time somewhat less than that of the monostable multivibrator comprising tube W1(7) and tube W2(7), e.g., in order of one quarter of the period of the signal transmission speed. Since tube X1(7) is normally conducting, at each positive-to-negative transition of the voltage applied to capacitor 727, a negative pulse will be applied to the control grid of tube X1(7) to drive that tube temporarily nonconductive. As a result, an output wave form will appear on conductor 729 of the form represented in curve X of Fig. 10, and it is these positive-going square-wave pulses which are applied to the control grids of the translator tubes H0(4) to H9(5). Since translator tube H6(5) has been prepared to conduct, as hereinbefore described, upon the application of a positive pulse via conductor 729 and resistor 525 to its control grid, a positive pulse will be transmitted through capacitors 530 and 531 to conductors EE and BB, respectively.

These two conductors are part of a group of five conductors AA to EE which are connected to the digit register circuit for the purpose of transferring information to that register on a two-out-of-five code basis. It will be noted that positive pulses are applied to a selected pair of these conductors in accordance with which one of the translator tubes H0(4) to H9(5) is conductive. Thus, the cathode of translator tube H0(4) is connected to conductors AA and BB through capacitors 420 and 421, respectively, the cathode of translator tube H1(4) is connected to conductors AA and CC through capacitors 422 and 423, respectively, the cathode of translator tube H2(4) is capacitively connected to conductors AA and DD, the cathode of translator tube H3(4) is capacitively coupled to conductors AA and EE, the cathode of translator tube H4(4) is capacitively coupled to conductors BB and CC, etc. with each of the translator tubes H0(4) to H9(5) being connected to a different pair of the conductors AA to EE.

Each of the conductors AA to EE is connected through an indiivdual capacitor to the start electrode of a cold cathode triode in each of a plurality of register banks. Thus, conductor AA is connected through capacitor 811 to the start electrode of cold cathode triode AA(8), through capacitor 913 to the start e'ectrode of cold cathode triode BA(9), through other individual capacitors to the start electrodes of additional cold cathode triodes (not shown), and through capacitor 914 to the start electrode of cold cathode triode UA(9).

Conductor BB is similarly connected to cold cathode triodes AB(8), BB(9), others not shown, and UB(9) and the other conductors CC to EE are similarly associated with cold cathode triodes. Each of the horizontal groups of cold cathode triodes, as represented in Figs. 8 and 9 of the drawings, is an element of one digit bank. A number of these banks are provided in accordance with the number of digits which constitute the received designation. The A bank, comprising tubes AA(8) to AE(8), will store, on a two-out-of-five basis, the first or "A" digit of the designation, the second bank comprising tubes BA(9) to BE(9) will store the second or "B" digit of the designation, and the bank comprising tubes UA(9) to UE(9) will store the last (normally the units) digit of the designation.

While the pulses which appear on conductors AA to EE are concurrently applied to all of the corresponding cold cathode triodes in all of the digit-register banks, only one of these banks is enabled at any one time. A chain circuit, comprising tubes AA1(8) to KP2(9) performs the function of sequentially enabling the several digit-register banks so that each of these banks will be enabled to operate during the time, and only during the time, that the digit is being received which is to be stored in that particular bank.

This chain circuit consists of a pluralitv of bistable multivibrators, each of these stages consisting of a pair of triodes such as, for example, triodes AA1(8) and AA2(8). The anode of tube AA1(8) is connected to the control grid of tube AA2(8) by means of a network comprising resistor 804 in parallel with capacitor 803 and resistor 805 connected to a source of negative potential. The anode of tube AA2(8) is connected to the grid of tube AA1(8) by means of resistor 801. With a proper selection of parameters, tubes AA1(8) and AA2(8) will be bi-stable in their operation, i.e., regardless of which of the two tubes is conducted at any time, that condition will maintain indefinitely in the absence of an input pu'se. The cathode of each of the right-hand sections, such as section AA2(8), is grounded, while the cathode of each of the left-hand sections, such as section AA1(8), is connected to conductor 345 which extends to the cathode of tube P(3) and which has applied thereto a series of pulses represented in curve V of Fig. 10, as was hereinbefore described.

The parameters of the several bi-stable multivibrators comprising tubes AA1(8) to KP2(9) are selected so that upon the application of plate potential to conductor 311, as previously described, each of the chain-circuit multivibrators will become conducting on its right-hand section, i.e., tubes AA2(8), BB2(9), the intermediate "2" tubes, tube UU2(9) and tube KP2(9) will become conducting. Immediately thereafter, however, the bi-stable multivibrator comprising tubes UU1(9) and UU2(9) will be triggered to its opposite state. Thus, relay ON(3), in operating, will complete a circuit from positive battery through its No. 5 contact, conductor 343, No. 2 contact of unoperated relay RO(3), conductor 344, capacitor 901, and resistor 914 to negative battery. As a result, a positive pulse will be applied to the control grid of tube ST(9), whereupon a negative pulse will be applied via conductor 902 to the control grid of tube UU2(9) and to the anode of tube UU1(9), so that tube UU1(9) will be rendered conductive and tube UU2(9) will be driven below cut-off. This action, it will be noted, occurs prior to the receipt of any incoming signal frequencies, and the chain circuit shown in Figs. 8 and 9 is shaded to represent the state of conduction at this instant.

The chain circuit will remain in this condition until a positive pulse appears on conductor 345. The first such pulse occurs at the center of the KP signal, i.e., at the point marking the termination of the first KP signal frequency and marking the beginning of the second KP signal frequency. This positive pulse will obviously be ineffective when applied to the cathode of any tube which is already nonconducting. However, when applied to the cathode of any tube which is then conducting (at the instant under consideration, tube UU1(9)) that tube will be driven below cut-off, triggering the bi-stable multivibrator to its other state. Therefore, upon the receipt of this first pulse on conductor 345, the potential at the anode of tube UU1(9) will sharply rise in potential and this sharp rise will be applied to conductor 902, differentiated by capacitor 905 and resistor 915, and applied to the control grid of tube KP1(9). As a result, tube KP1(9) will be rendered conductive, with tube KP2(9) being driven below cut-off. The resultant reduction in potential appearing at the anode of tube KP1(9) and on conductor 906 will be ineffective to produce any result at this time, but it is nonetheless represented in curve XIII of Fig. 10.

This condition will exist until the next positive pulse is received via conductor 345. This next pulse will occur at the middle of the first digit signal, as is shown in curve V. Since only tube KP1(9) of the several "1" tubes is conducting at this instant, only tube KP1(9) will be driven below cut-off by this pulse, whereby tube KP2(9) will be rendered conductive. The resultant sharp rise in potential at the anode of tube KP1(9) (shown in curve XIII) is applied to conductor 906, differentiated by capacitor 808 and resistor 802, and applied to the control grid of tube AA1(8) whereby the bi-stable multivibrator including tube AA1(8) is triggered to its opposite stable state wherein tube AA1(8) is conducting and tube AA2(8) is driven below cut-off. The potential appearing at the anode of tube AA2(8), represented in curve XIV of Fig. 10, is applied through individual resistor networks such as resistors 809 and 810 to the control electrodes of the "A" bank digit register cold cathode triodes AA(8) to AE(8) for a purpose hereinafter to be described.

At the next pulse on conductor 345, the bi-stable multivibrator comprising tube AA1(8) and AA2(8) will be triggered so that section AA1(8) is driven below cut-off and section AA2(8) is rendered conductive. As a result, the potential at the anode of section AA2(8) is restored to its normal low value, as is shown in curve XIV of Fig. 10. Thus, the anode of tube AA2(8), and therefore the start electrodes of tubes AA(8) to AE(8), are at a relatively high positive value of potential for a period from the center of the first or "A" digit to the center of the second or "B" digit.

Upon the restoration of tube AA1(8) to its nonconducting condition, a positive pulse is applied from its anode via conductor 814 to the control grid of tube BB1(9) to trigger the bi-stable multivibrator comprising tubes BB1(9) and BB2(9) to its non-normal state. At the next pulse on conductor 345, the circuit comprising tubes BB1(9) and BB2(9) is restored to normal and the next succeeding bi-stable multivibrator in the chain circuit is triggered to its non-normal state. Succeeding pulses on conductor 345 trigger the succeeding chain circuit stages successively.

Reverting now to a consideration of the "A" digit register bank, the cathode of each of the cold cathode triodes in this bank, such as triode AA(8), is connected to ground through the winding of an individual relay such as relay RAA(8), and the anodes of the tubes AA(8) to AE(8) are connected to the source of plate potential on conductor 311 through the windings of relays RA2(8) and RA1(8). Consequently, with the bi-stable multivibrator comprising tubes AA1(8) and AA2(8) triggered so that a positive potential is applied to the control electrodes of triodes AA(8) to AE(8) for a short interval including the last half of the time during which the first digit is being received, the selective pulsing of two of the conductors AA to EE in the manner hereinbefore described will result in two of the tubes AA(8) to EE(8) being rendered conductive. Under the assumed example of the first digit received being the digit "6," whereby conductors BB and EE are pulsed, tubes AB(8) and AE(8) will be discharged whereupon relays RAB(8) and RAE(8) will be operated. Due to the nature of the cold cathode triode, conduction will continue in the tubes and those relays will continue to be operated despite the termination of the aplication of positive potential to the start electrodes of those tubes.

In a similar fashion, two of the five cold cathode triodes in each of the succeeding register banks will be discharged in accordance with the value of the digit which is to be stored in that digit-register bank, with the corresponding pair of register relays being operated. Contacts are provided on the register relays to transmit the stored information to a call indicator, to a register, or to any other circuit in the manner well known in the art.

Means are provided for transmitting an "OK" signal to the signal transmitter of Fig. 2 if two of the cold cathode gaseous discharge devices AA(8) to UE(9) have been discharged in each of the digit-register banks, and to transmit a recorder signal if either more or less than two of the cold-cathode devices have been discharged in any one of the banks. The primary control instrumentalities for performing these functions are the marginal relays individual to each of these banks, comprising relays RA1(8) and RA2(8) individual to the "A" digit-register bank, relays RB1(9) and RB2(9) individual to the "B" digit-register bank, corresponding pairs of relays individual to the intermediate digit-register banks, and relays RU1(9) and RU2(9) individual to the final or "U" digit-register bank. As was before indicated, the windings of the pair of marginal relays individual to each of the digit register banks are serially included in the anode circuit of each of the cold cathode triodes within that digit register bank. The "2" relay, such as relay RA2(8), will operate if two or more of the cold cathode triodes in the associated digit-register bank, for example, two or more of the triodes AA(8) to AE(8), have been discharged, and the "1" relay, such as relay RA1(8), will operate if three or more of the associated cold-cathode triodes have been discharged. Therefore, if one or none of the gas tubes in any digit-register bank has been operated, neither the "1" nor the "2" marginal relay associated with that bank will be operated; if two or those triodes have been discharged, the associated "2" relay will operate; and if three or more of the triodes have been discharged, both the "2" and the "1" marginal relay will be operated.

If the incoming number has been properly stored so that two and only two of the cold-cathode triodes have been operated in each of the digit-register banks, a circuit will be completed from ground, No. 1 contact of unoperated relay RA1(8), No. 1 contact of operated relay RA2(8) and through the No. 1 contacts of all the other marginal relays associated with all of the other digit-register banks to conductor 910, which extends to Fig. 3, through the winding of relay OK1(3) to negative battery, whereby relay OK1(3) is operated. Relay OK1(3), in operating, locks to ground through its No. 3 contact and the No. 3 contact of relay T(3) and completes a circuit from negative battery through its No. 4 contact, winding of relay OK(3), No. 2 contact of relay T(3) to ground, to operate relay OK(3). Relay OK(3), in operating, transfers the incoming trunk conductors 221 and 222 to the OK frequency circuit comprising alternating-current generator OKF(3).

Relay OK1(3), in operating, also completes a circuit from the positive potential on conductor 310 through resistor 347, No. 2 contact of relay OK1(3) and capacitor 348 to ground. After an appropriate time interval capacitor 348 will charge to a value such that the plate current of vacuum tube JJ(3) will be adequate to operate relay T(3). Relay T(3), in operating, interrupts, at its No. 2 contact, the operating circuit for relay OK(3), whereupon the transmission of the OK frequency over trunk conductors 221 and 222 to the signal transmitter of Fig. 2 is terminated. Relay T(3), in operating, also interrupts, at its No. 3 contact, the locking circuit for relay OK1(3) and disables, by removing ground from its No. 1 contact, the operating circuit for relay RO(3), which will be traced hereinafter. This sequence of operations will result in a timed interval of an "OK" frequency being transmitted to dismiss the signal transmitter as was previously described. It will be noted that the above-described sequence of operations was precipitated by the grounding of conductor 910 and that conductor 910 will not be grounded if in any one of the digit-register banks either less or more than two of the cold cathode triodes were discharged.

If in any one of the digit-register banks the "1" relay, such as relay RA1(8), is operated as the result of more than two of the cold cathode triodes in that bank, such as triodes AA(8) to AE(8), being discharged, ground will be applied to conductor 911, which extends to Fig. 3, to cause the operation of relay RO1(3). Relay RO1(3) will lock operated through its No. 3 contact and the No. 3 contact of relay T(3) and will complete a circuit from negative battery through its No. 4 contact, winding of relay RO(3), No. 1 contact of relay T(3), to ground to operate relay RO(3). Relay RO(3), in operating, connects the incoming trunk conductors 221 and 222 to the reorder frequency circuit comprising an alternating-current supply ROF(3). Relay RO1(3), in operating, also completes a circuit from the positive potential on conductor 310, resistor 347, No. 2 contact of relay RO1(3), No. 1 contact of relay OK1(3), capacitor 348 to ground, whereupon, after a suitable interval, tube JJ(3) will conduct adequately to operate relay T(3) as before described. Relay T(3), in operating, interrupts at its No. 1 contact the energizing path for relay RO(3) to terminate the transmission of the reorder frequency. The transmission of this timed reorder signal will cause the signal transmitter of Fig. 2 to operate to retransmit the signaling frequencies in a manner previously described.

Tube J2(3) performs certain functions incident to the preparation of the register to receive retransmitted signals. It will be recalled that tube M(3) is normally disabled to amplify the incoming pulses which are applied from the anode of tube L2(3) but, upon the application of a voltage to capacitor 330 resulting from the receipt of the first frequency representing the KP signal, tube J1(3) will conduct adequately to apply an enabling potential to the control grid of tube M(3). These operations are performed to insure that tube M(3), and the succeeding circuits, will not respond to the first frequency of the KP signal. See curves I, II and III of Fig. 10. When relay RO(3) is operated to open its No. 1 contact as the result of an improper registration, conductor 311 is disconnected from conductor 310 so that plate potential is removed from all of the digit-register circuits and from most of the tubes in Figs. 3 and 4 of the drawings, including tube J1(3), to restore the circuits to a condition in which they may respond to the retransmitted signal frequencies.

Upon the extinction of conduction in tube J1(3), capacitor 330 remains charged since it cannot discharge through the high back impedance of varistor VR1(3). However, if capacitor 330 were to remain in this charged condition upon the release of relay RO(3) and the subsequent reapplication of plate potential via conductor 311 to the several circuits, tube J1(3) would immediately conduct to a substantial degree so that tube M(3) would be enabled to amplify the pulse appearing at the anode of tube L2(3) as a result of the first frequency of the KP signal. To prevent this malfunctioning, tube J2(3) is provided to discharge capacitor 330 immediately after the transition between the first and second frequencies constituting the signal for the last or units digit of the received digital representation.

It will be recalled that a positive pulse is applied via conductor 924 to the control grid of tube UU1(9) in the stepping chain at the point of transition of the signal representing the last or units digit from its first to its second frequency. This positive pulse is also applied through capacitor 925 and via conductor 926 to the control grid of tube J2(3). Since the cathode of tube J2(3) is grounded and since the anode of tube J2(3) is connected to the upper electrode of capacitor 330, upon the application of this positive pulse to the control grid of tube J2(3), capacitor 330 will be discharged through tube J2(3). The resulting decreased plate current through tube J1(3) will result in a restoration of the disabling potential to tube M(3) as is shown in curve II of Fig. 10. During the transmission of the second component frequency of the units digit signal, capacitor 330 will again charge to a positive value, but as was before indicated the parameters of the circuit including tube J1(3) are so selected that tube M(3) will be enabled only if capacitor 330 is charged by the application thereto of a positive potential of the amplitude of that resulting from the receipt of the first component frequency of the KP signal. Therefore, tube M(3) will not be enabled despite the receipt of the second component frequency of the units digit regardless of the value of that units digit. It will also be noted that upon the disabling of the receiver circuit, with the resultant release of relay ON(3), capacitor 330 will be discharged by virtue of the connection of its upper electrode to ground through the No. 8 contact of relay ON(3).

Provision is also made for the transmission of a reorder signal to the signal transmitter if only one of the cold-cathode triodes has been discharged in any one of the digit-register banks. It will be recalled that if in any one of the digit-register banks only one of the tubes is discharged, neither the "1" nor the "2" marginal relay individual to that bank will be operated, so that ground will be applied through the No. 1 back contact of the unoperated "1" relay and through the No. 2 back contact of the unoperated "2" relay to conductor 912. It will be observed that prior to the registration of any digit conductor 912 is grounded and will continue to be grounded unless at least one of the marginal relays associated with each of the digit-register banks is operated. Conductor 912 extends to the front contact of relay TCR(3). Vacuum tube TC(3) and relay TCR(3) are part of that which is essentially a time-out circuit. Upon the operation of relay ON(3) when the register is first seized, positive battery is connected through resistor 350, No. 9 contacts of relays ON(3) and RO(3), conductor 351, and capacitor 352 to ground, whereupon capacitor 352 will commence to charge. When capacitor 352 is charged to an adequate value, the plate current through tube TC(3) will be adequate to operate relay TCR(3). The parameters of the circuits are so selected that relay TC(3) will not operate until the incoming signal frequencies have been received and registered under normal conditions. If relay RO(3) is not operated to interrupt the charging circuit for capacitor 352 before the expiration of this selected period or if relay ON(3) has not been released as the result of the transmission of the "OK" frequency and the resultant dismissal of the register, relay TCR(3) will be operated to connect conductor 912 to the winding of relay RO1(3). If less than two digits have been registered in any one of the digit register banks so that conductor 912 is grounded at this time, relay RO1(3) will be operated to precipitate the previously described sequence of operations whereby a reorder frequency is transmitted to the signal transmitter of Fig. 2.

Provision is also made for the transmission of a reorder signal if the transmission of the incoming signal frequency is terminated before the correct number of digits has been received. It will be recalled that upon the seizure of the register, with the resultant operation of relay ON(3) and the resultant transmission of a pulse by tube ST(9), the counting chain will be in the condition depicted in Figs. 8 and 9 in which tube UU1(9) is conducting and in which all others of the counting chain stages are conducting on their right-hand or "2" sections. Under this initial condition, the plate potential appearing on conductor 311 also appears on conductor 917 so that the voltage appearing at the control grid of tube TO1(9) is relatively high. Consequently, the anode of tube TO1(9) will be at a relatively low positive value due to the potential drop across its load resistor 920. As a result, the potential at the upper electrode of capacitor 921 will also be at a relatively low positive value so that the current through cathode follower TO2(9) will be insufficient to develop a potential drop across cathode resistor 922 adequate when applied to the control electrode of cold-cathode triode TO3(9) to cause that cold-cathode triode to discharge. However, at the center of the KP signal, the bi-stable multivibrator comprising tubes UU1(9) and UU2(9) will be triggered so that tube UU2(9) will be conducting with a resultant reduction in the potential applied to conductor 917, a resultant increase of the anode potential of tube TO1(9), a resultant increase in the potential to which capacitor 921 is charged, a resultant increase in plate current in cathode follower TO2(9), a resultant increase in the cathode potential of tube TO2(9), a consequent discharge of cold-cathode triode TO3(9) and a resultant operation of relay RO4(9), which is included in the plate circuit of cold-cathode triode TO3(9). This series of operations can occur, however, only if the counting-chain stage comprising tubes UU1(9) and UU2(9) is not restored to the depicted condition prior to the time that capacitor 921 is charged to the critical value; and in the normal operation of the system, the chain-circuit stage is restored at the center of the units digit. The time constant of the circuits are so selected that under this normal operation, tube TO3(9) will not be discharged and relay RO4(9) will not be operated. It is only under the abnormal condition of a cessation of transmission and a resultant cessation of stepping of the counting chain that tube TO3(9) will discharge and relay RO4(9) operate. Relay RO4(9), in operating, completes a circuit from ground at its front contact, conductor 911, winding of relay RO1(3) to negative battery to operate relay RO1(3) to institute the previously described reorder operations.

In addition to the foregoing features, another self-checking feature is provided to make certain that two frequencies are received for each digit and to make certain that these frequencies bear the prescribed relationship one to the other. As has been hereinbefore described, each digit is represented by two frequencies which vary by equal amounts from a 1000-cycle-persecond base frequency. Therefore, the successive voltages appearing on conductors A1 and B1 as a result of the receipt of the two frequencies representing any one digit should be equal. If for any reason the successive voltages are not equal, it is an indication either that one of the frequencies is missing or that at least one of the frequencies is of an improper value. Means are therefore provided for comparing these voltages. At any time that the voltages are determined to be unequal, a reorder signal is transmitted to the center.

To perform this voltage comparison, conductor B1 is connected through varistor VR3(7), resistor 732, and capacitor 733 to ground whereby capacitor 733 becomes charged to a value determined by the voltage on conductor B1. The voltage at the upper electrode of capacitor 733 is applied to the control grid of tube Y(7). Similarly, the voltage on conductor A1 is applied through varistor VR2(7), resistor 734, and capacitor 735 to ground, and the resultant potential at the upper electrode of capacitor 735 is applied to the control grid of triode Z(7). Since rectifying elements VR2(7) and VR3(7) prevent the discharge of capacitors 735 and 733, respectively, through the cathode resistors of tubes F2(3) and F1(3), respectively, there is normally no effective discharge path for either capacitor 733 or 735. Therefore, during the last half of each digit signal, each of capacitors 733 and 735 will be charged to a value which is a function of the voltage on conductor B1 or A1, respectively. It is these values which are to be compared.

Tubes Y(7) and Z(7) have their cathodes grounded through load resistors 738 and 739, respectively, and their anodes are connected to the cathode of tube FF(7) which is normally below cut-off so that no plate voltage is applied to tube Y(7) and Z(7). Plate potential is applied to tubes Y(7) and Z(7) but once per digit. Thus, it will be recalled that the potential appearing at the anode of tube X1(7), i.e., the potential appearing on conductor 729, is represented in curve X of Fig. 10 and comprises a short duration positive-going square-wave pulse appearing during the last half of the two-frequency signal representing each of the digits. These positive pulses are applied through resistor 737 to the control grid of triode FF(7) whereby during the reception of each of these pulses the cathode of tube FF(7) rises to a value approaching that of the plate supply voltage on conductor 311 so that tubes Y(7) and Z(7) may conduct, producing a consequent potential drop across the load resistors 738 and 739, respectively. The voltages developed across these load resistors will, of course, be a function of the voltage across capacitors 733 and 735, respectively. The cathode of tube Y(7) is connected by means of capacitor 740 to one terminal of the primary winding of transformer T2(7), and the cathode of tube Z(7) is connected via capacitor 741 to the other terminal of the primary winding of transformer T2(7). If the voltages at the cathodes of tubes Y(7) and Z(7) are equal, no voltage will appear across the secondary winding of transformer T2(7). If the voltages are different, however, a current will momentarily flow in the primary of transformer T2(7) producing a voltage in the secondary winding of that transformer which is applied across full wave rectifier RE2(7), producing a direct voltage across resistor 742. This voltage is applied to the control electrode of cold-cathode triode GG(7) to discharge that triode and to operate relay RO3(7) which is included in the plate circuit of tube GG(7). Relay RO3(7), in operating, will ground conductor 911 to operate relay RO1(3) to institute the recorder operations of the receiver as previously described.

After the voltages on conductors A1 and B1 have been compared in this fashion, capacitors 733 and 735 must be discharged in preparation for the comparison of the voltages on these two conductors during the reception of the next succeeding digit. To perform this operation, pulses appearing at the anode of tube N2(3), i.e., on conductor 351, which are shown in curve IV of Fig. 10, are differentiated and applied to the control grid of tube HH1(7) which is an element of a monostable multivibrator of the type previously described. Since tube HH1(7) is normally below cut-off with tube HH2(7) normally conducting, upon each negative-to-positive transition of the wave form on conductor 351, tube HH1(7) will be rendered conductive and will continue to remain so for an interval determined by the parameters of the monostable multivibrator circuit. The resultant wave form at the anode of tube HH1(7) is shown in curve XI of Fig. 10. This wave is differentiated by means of capacitor 744 and resistor 745, producing a series of negative and positive pips represented in curve XII of Fig. 10. It will be noted from that curve that a positive pip occurs substantially concurrently with the trailing edge of the positive-going pulse represented in curve X which controlled the comparing operation. At each of these positive pips tubes KK1(7) and KK2(7) are rendered momentarily conductive to discharge capacitors 733 and 735, respectively. It will be noted that while the above-described checking operation will take place once for every received digit, it will not function on the preliminary "KP" signal since no pulse appears on conductor 729 (curve X) during the reception of that KP signal.

When the call indicator circuit or register (represented in block diagrammatic form in Fig. 8) or other control circuit has received the registered designation, the ground will be removed from conductor 220 to release relay ON(3). Relay ON(3), in releasing, restores the register to normal and in condition for further use.

It is to be understood that the above-described arrangements are but illustrative of the application of the principles of the invention. Numerous other arrangements may be devised by those skilled in the art without departing from the spirit and scope of the invention.

What is claimed is:

1. In a signaling system, means for sequentially transmitting a first alternating-current frequency signal having a selectable directional deviation from a fixed reference frequency and a second alternating-current frequency signal having an opposite directional deviation of predetermined amount with respect to said fixed reference frequency, two groups of registering devices, first means responsive to the directional deviation and independent of the amount of deviation with respect to said reference frequency of said first signal for enabling a selected one of said groups of devices, and second means responsive to the amount of the opposite directional deviation with respect to said reference frequency of said second signal for operating a selected one of said devices in said one of said groups.

2. In a signaling system, means for sequentially transmitting a first alternating-current frequency signal having a selectable directional deviation from a fixed reference frequency and a second alternating-current frequency signal having a predetermined opposite directional deviation of predetermined amount with respect to said fixed reference frequency, two groups of discharge devices, a source of operating potential connectable to each of said groups of devices, first means responsive to the directional deviation and independent of the amount of deviation with respect to said reference frequency of said first signal for connecting said source to one of said groups of devices, second means responsive to the amount of the opposite directional deviation with respect to said reference frequency of said second signal for selectively discharging a selected one of said devices in said selected one of said groups, and means for maintaining said first means operative during the operation of said second means.

3. In a signaling system, means for sequentially transmitting a first alternating-current frequency signal having a selectable directional deviation from a fixed reference frequency and a second alternating-current frequency signal having a predetermined opposite directional deviation of predetermined amount with respect to said fixed reference frequency, said first and second signals representing a digit, digit registering means, a pair of groups of devices for controlling said registering means, first means responsive to the directional deviation and independent of the amount of deviation with respect to said reference frequency of said first signal for enabling one of said groups of devices, and second means responsive to the amount of the opposite directional deviation with respect to said reference frequency of said second signal for operating a selected one of said devices in said enabled group, said second means including additional means for providing a direct-current voltage proportional to the amount of the opposite directional deviation with respect to said reference frequency of said second signal.

4. In a signaling system as set forth in claim 3 further including means common to said first and said second means for establishing a reference condition corresponding to said reference frequency.

5. In a signaling system, means for sequentially transmitting four alternating-current signal frequencies, the third and fourth of said signal frequencies being complementary and having a predetermined deviation from a base frequency to represent a digit, digit-registering means, two groups of electron discharge devices controlling said digit-registering means, a source of operating potential for said devices, control means responsive to the first and the second of said signal frequencies, means controlled by said control means and responsive to said third signal frequency for connecting said source to a selected one of said groups of devices, and means responsive to said fourth signal frequency for discharging a selected one of the devices in said one of said groups of devices.

6. In a signaling system, means for transmitting an alternating-current signal frequency of selectable deviation from a reference frequency, a first group of registering devices, a second group of registering devices, means responsive to said first signal for applying to said first group of registering devices a direct voltage having an amplitude directly proportional to said deviation from said reference frequency, and means responsive to said signal for applying to said second group of registering devices a direct voltage having an amplitude inversely proportional to said deviation from said reference frequency.

7. In a signaling system, means for transmitting an alternating-current signal frequency of selectable deviation from a reference frequency, a first group of registering devices, a second group of registering devices, means responsive to said signal for applying to said first group of registering devices a direct voltage having an amplitude directly proportional to said deviation from said reference frequency, and means responsive to said signal for applying to said second group of registering devices a direct voltage having an amplitude inversely proportional to said deviation from said reference frequency, the successive devices in each of said groups being operative in response to successively higher amplitude direct voltages.

8. In a signaling system, means for transmitting an alternating-current signal of a selectable frequency, a first and a second group of electron discharge devices, means for biasing the devices within each of said groups of devices successively more negative, means responsive to said signal for applying to said first group of devices a positive direct voltage having an amplitude directly proportional to said frequency, and means responsive to said signal for applying to said second group of devices a positive direct voltage having an amplitude inversely proportional to said frequency.

9. In a signaling system, means for sequentially transmitting a pair of alternating-current signals of different frequencies representing a digit, digit-registering means, a first and a second group of electron discharge devices controlling said registering means, a source of operating potential for said devices, means responsive to the first of said signal frequencies for connecting said source to a selected one of said groups of devices, means for biasing the devices within each of said groups successively more negative, means responsive to said second signal frequency for applying to said first group of devices a positive direct voltage having an amplitude directly proportional to said second frequency, and means responsive to said second signal frequency for applying to said second group of devices a positive direct voltage having an amplitude inversely proportional to said second frequency.

10. In a signaling system, means for sequentially transmitting a first and a second alternating-current signal, the frequencies of said signals having an equal magnitude of deviation from a base frequency, means responsive to said first signal frequency for producing a first direct voltage having an amplitude directly proportional to said first frequency, means for storing said first voltage, means responsive to said second signal frequency for producing a second direct voltage having an amplitude inversely proportional to said second frequency, and means for comparing said stored first voltage and said second voltage.

11. In a signaling system, means for sequentially transmitting a first and a second alternating-current signal, the frequencies of said signals having an equal magnitude of deviation from a base frequency, means responsive to said first signal frequency for producing a first direct voltage having an amplitude directly proportional to said first frequency, a capacitor for storing said first voltage, means responsive to said second signal frequency for producing a second direct voltage having an amplitude inversely proportional to said second frequency, a capacitor for storing said second voltage, means effective during the receipt of said second signal frequency for comparing said stored voltages, and means for discharging said capacitors.

12. In a signaling system, means for sequentially transmitting alternating-current signals of a plurality of frequencies, means for developing a direct voltage having an amplitude which changes as said frequencies change, control means responsive to a preselected one of said signal frequencies, pulse-generating means controlled by said control means and responsive to each change of said direct voltage, and means responsive to the receipt of a preselected number of said signal frequencies for disabling said control means.

13. In a signaling system, means for transmitting sequentially a first and a second signal having a predetermined frequency relationship representing a code, said first and said second signals being equally and oppositely deviated from a base frequency, a first electron discharge device, a second electron discharge device, each of said discharge devices having two states of conductivity, an output device, means responsive to said first signal for enabling said discharge devices, means responsive to said second signal for selectively operating said discharge devices, means including said output device for connecting said first and second devices, and means responsive to the sequential presence of said first and second signal to operate said output device if said first and second discharge devices are in opposite states on conduction.

14. In a signaling system, means for transmitting sequentially a first frequency signal and a second frequency signal having a predetermined frequency relationship representing a code, a plurality of electron discharge devices having a normal and a conductive state, means responsive to said first frequency signal to enable said discharge device, means responsive to said second frequency signal to selectively render said discharge devices conductive, a translating device common to each adjacent pair of said discharge devices, means for enabling said translating device which is common to a conducting one and a nonconducting one of said electron discharge devices, and means effective during the transmission of said second signal to operate said translating device.

15. In a signaling system, means for transmitting sequentially complementary signals of predetermined alternately-current frequencies representing a code, each of said frequencies being equally and oppositely deviated from a reference frequency, means to derive direct-current signals representative of each of said frequency signals, output circuit means selectively enabled by said derived direct-current signals, and means responsive to the sequential presence of said direct-current signals for operating said output circuit.

16. In a signaling system, a transmitter for sequentially transmitting a first and a second alternating-current signal representing a digit, each of said signals having a frequency deviation of a predetermined amount from a base frequency, digit storage means associated with said transmitter, two groups of normally unenergized registering devices, means responsive to said first signal to selectively enable one of said groups of devices, means responsive to said second signal to selectively operate one of said enabled devices to register the digit, and means responsive to the registration of said digit to deenergize said storage means.

17. In a signaling system, means for transmitting an alternating-current signal frequency of selectable deviation from a reference frequency, a translator including means for converting said alternating-current signal frequency to two representative direct voltages, one of said voltages being directly proportional to and the other of said direct voltages being inversely proportional to said deviation from said reference frequency, a first operating circuit, a second operating circuit, a first conductor connecting said translator and said first operating circuit, a second conductor connecting said translator and said second operating circuit, said translator responsive to said alternating-current signal frequency for applying to said first conductor said direct voltage directly proportional to said deviation from said reference frequency and to said second conductor said direct voltage inversely proportional to said deviation from said reference frequency.

References Cited in the file of this patent

UNITED STATES PATENTS

| | | |
|---|---|---|
| 1,383,750 | Parker | July 5, 1921 |
| 1,740,556 | White | Dec. 24, 1929 |
| 1,786,805 | Wensley | Dec. 30, 1930 |
| 2,295,534 | Leathers | Sept. 15, 1942 |
| 2,410,821 | Hillman | Nov. 12, 1946 |
| 2,522,609 | Gloess | Sept. 19, 1950 |
| 2,523,300 | Herbst | Sept. 26, 1950 |
| 2,535,043 | Cook | Dec. 26, 1950 |
| 2,550,600 | Rehm | Apr. 24, 1951 |
| 2,554,329 | Hammond | May 22, 1951 |
| 2,559,622 | Hildyard | July 10, 1951 |
| 2,629,088 | Kendall | Feb. 17, 1953 |
| 2,658,189 | Lovell | Nov. 3, 1953 |
| 2,672,603 | Cutler | Mar. 16, 1954 |
| 2,688,441 | Merrill | Sept. 7, 1954 |